US012569703B2

(12) United States Patent
Chen et al.

(10) Patent No.: US 12,569,703 B2
(45) Date of Patent: Mar. 10, 2026

(54) APPARATUS AND METHOD REDUCING HUMIDITY IN RESPIRATORY PROTECTIVE DEVICE

(71) Applicant: HONEYWELL SAFETY PRODUCTS USA, INC., Charlotte, NC (US)

(72) Inventors: Enyi Chen, Charlotte, NC (US); Xiaojin Han, Charlotte, NC (US); Hang Tian, Charlotte, NC (US); Wei Shi, Charlotte, NC (US)

(73) Assignee: Honeywell Safety Products USA, Inc., Latham, NY (US)

( * ) Notice: Subject to any disclaimer, the term of this patent is extended or adjusted under 35 U.S.C. 154(b) by 737 days.

(21) Appl. No.: 18/060,895

(22) Filed: Dec. 1, 2022

(65) Prior Publication Data

US 2023/0181936 A1 Jun. 15, 2023

(30) Foreign Application Priority Data

Dec. 15, 2021 (CN) ......................... 202111533448.6

(51) Int. Cl.

| | |
|---|---|
| ***A62B 9/00*** | (2006.01) |
| ***A62B 7/10*** | (2006.01) |
| ***A62B 18/00*** | (2006.01) |
| ***A62B 18/08*** | (2006.01) |

(52) U.S. Cl.
CPC ................ *A62B 9/003* (2013.01); *A62B 7/10* (2013.01); *A62B 9/006* (2013.01); *A62B 18/006* (2013.01); *A62B 18/08* (2013.01)

(58) Field of Classification Search
CPC ......... A62B 7/10; A62B 18/006; A62B 18/02; A62B 18/025; A62B 18/04; A62B 18/045
See application file for complete search history.

(56) References Cited

U.S. PATENT DOCUMENTS 7,913,692 B2 3/2011 Kwok
2022/0296937 A1 * 9/2022 Chu ....................... A62B 18/08

FOREIGN PATENT DOCUMENTS

KR 10-1819953 B1 1/2018
WO WO-2019043110 A1 * 3/2019 ............. A62B 9/003

* cited by examiner

*Primary Examiner* — Joseph D. Boecker
*Assistant Examiner* — Jaeick Jang
(74) *Attorney, Agent, or Firm* — Fredrikson & Byron, P.A.

(57) ABSTRACT

Apparatuses and methods reducing humidity in respiratory protective devices are provided. For example, an example respiratory protective device includes a humidity sensor component embedded in an exhalation filtration component of the respiratory protective device, at least one fan component positioned adjacent to an inhalation filtration component of the respiratory protective device, and a controller component in electronic communication with the humidity sensor component and the at least one fan component.

10 Claims, 12 Drawing Sheets

APPARATUS AND METHOD REDUCING HUMIDITY IN RESPIRATORY PROTECTIVE DEVICE

CROSS-REFERENCE TO RELATED APPLICATIONS

This application claims priority pursuant to 35 U.S.C. 119(a) to Chinese Application No. 202111533448.6, filed Dec. 15, 2021, which application is incorporated herein by reference in its entirety.

FIELD OF THE INVENTION

Example embodiments of the present disclosure relate generally to respiratory protective devices and, more particularly, to apparatuses and methods for reducing humidity in respiratory protective devices.

BACKGROUND

Applicant has identified many technical challenges and difficulties associated with masks. For example, when a mask is worn by a user, the humidity level within the mask may increase and cause user discomfort.

BRIEF SUMMARY

Various embodiments described herein relate to methods, apparatuses, and systems for reducing humidity in respiratory protective devices are provided.

In some embodiments, a respiratory protective device comprises a humidity sensor component embedded in an exhalation filtration component of the respiratory protective device, at least one fan component positioned adjacent to an inhalation filtration component of the respiratory protective device, and a controller component in electronic communication with the humidity sensor component and the at least one fan component.

In some embodiments, the controller component is configured to: receive a humidity indication from the humidity sensor component, wherein the humidity indication comprises a humidity value; calculate a humidity difference value between the humidity value and a threshold humidity value; determine a reverse rotation speed value for the at least one fan component based on the humidity difference value; and determine a reverse rotation start signal transmission time point and a reverse rotation stop signal transmission time point for the at least one fan component based at least in part on the reverse rotation speed value.

In some embodiments, when determining the reverse rotation speed value based on the humidity difference value, the controller component is configured to: compare the humidity difference value with a previous humidity difference value. In some embodiments, the previous humidity difference value is associated with a previous reverse rotation speed value of the at least one fan component.

In some embodiments, the controller component is configured to: determine that the humidity difference value increases from the previous humidity difference value; calculate a humidity difference increase value based on subtracting the previous humidity difference value from the humidity difference value; determine a reverse rotation speed increase value based at least in part on the humidity difference increase value; and set the reverse rotation speed value based at least in part on adding the reverse rotation speed increase value to the previous reverse rotation speed value.

In some embodiments, the controller component is configured to: determine that the humidity difference value decreases from the previous humidity difference value; calculate a humidity difference decrease value based on subtracting the humidity difference value from the previous humidity difference value; determine a reverse rotation speed decrease value based at least in part on the humidity difference decrease value; and set the reverse rotation speed value based at least in part on subtracting the reverse rotation speed decrease value from the previous reverse rotation speed value.

In some embodiments, the respiratory protective device further comprises a pressure sensor component disposed on an inner surface of the respiratory protective device.

In some embodiments, the controller component is configured to: receive a plurality of air pressure indications from the pressure sensor component. In some embodiments, the plurality of air pressure indications comprises a plurality of air pressure values.

In some embodiments, when determining the reverse rotation start signal transmission time point, the controller component is configured to: calculate a reverse rotation speed up adjustment time period based at least in part on the reverse rotation speed value; determine an exhalation starting time point based at least in part on the plurality of air pressure indications; and set the reverse rotation start signal transmission time point based on the exhalation starting time point and the reverse rotation speed up adjustment time period.

In some embodiments, the controller component is configured to: transmit a reverse rotation start signal to the at least one fan component at the reverse rotation start signal transmission time point.

In some embodiments, when determining the reverse rotation stop signal transmission time point, the controller component is configured to: calculate a reverse rotation slow down adjustment time period based at least in part on the reverse rotation speed value; determine an inhalation starting time point based at least in part on the plurality of air pressure indications; and set the reverse rotation stop signal transmission time point based on the inhalation starting time point and the reverse rotation slow down adjustment time period.

In some embodiments, the controller component is configured to: transmit a reverse rotation stop signal to the at least one fan component at the reverse rotation stop signal transmission time point.

In accordance with various embodiments of the present disclosure, an example method is provided. The example method comprises receiving a humidity indication from the humidity sensor component, wherein the humidity indication comprises a humidity value; calculating a humidity difference value between the humidity value and a threshold humidity value; determining a reverse rotation speed value for the at least one fan component based on the humidity difference value; and determining a reverse rotation start signal transmission time point and a reverse rotation stop signal transmission time point for the at least one fan component based at least in part on the reverse rotation speed value.

In accordance with various embodiments of the present disclosure, a computer program product is provided. The computer program product comprises at least one non-transitory computer-readable storage medium having computer-readable program code portions stored therein. The computer-readable program code portions comprise an executable portion configured to receive a humidity indication from the humidity sensor component, wherein the humidity indication comprises a humidity value; calculate a humidity difference value between the humidity value and a threshold humidity value; determine a reverse rotation speed value for the at least one fan component based on the humidity difference value; and determine a reverse rotation start signal transmission time point and a reverse rotation stop signal transmission time point for the at least one fan component based at least in part on the reverse rotation speed value.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
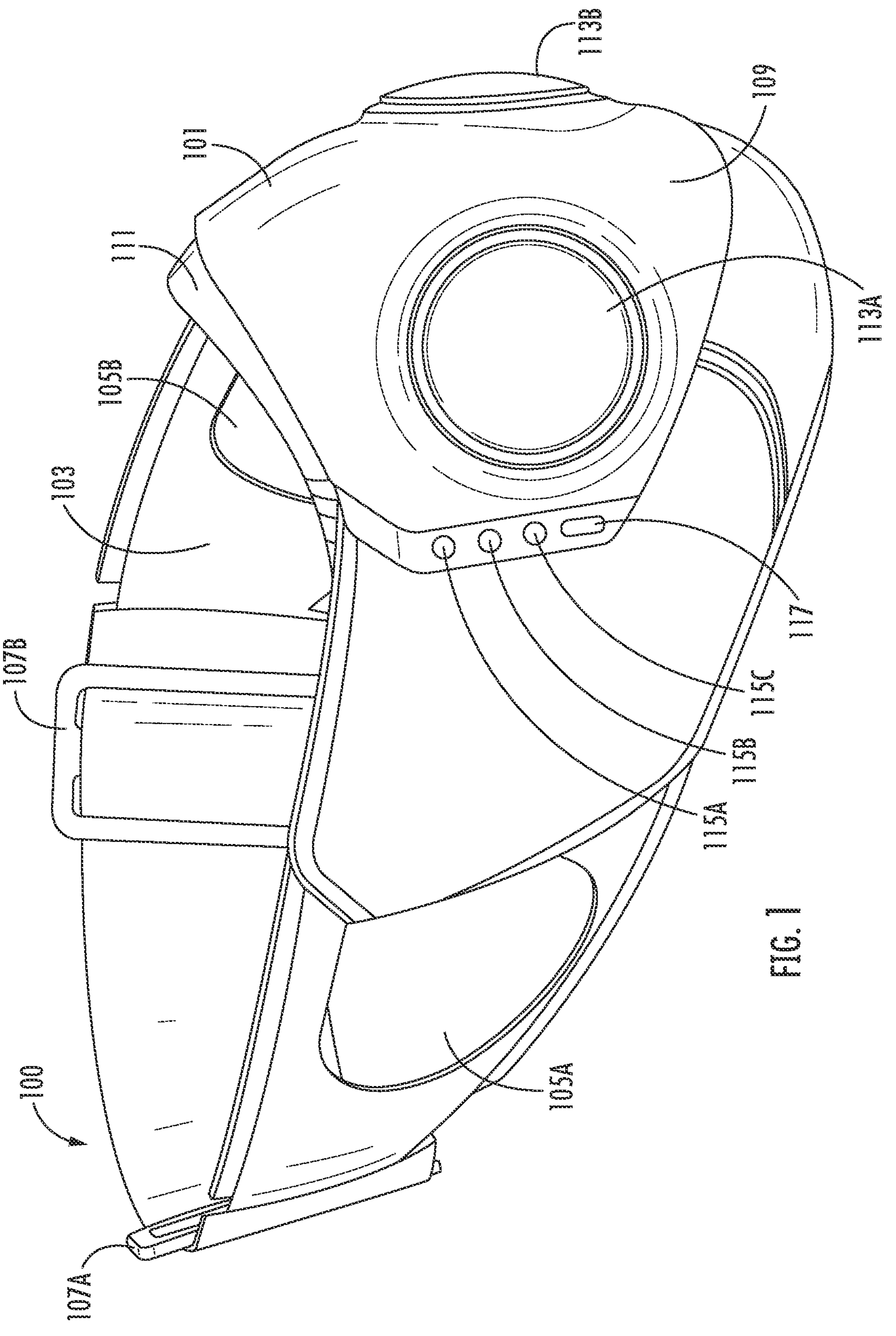
FIG. 1 illustrates an example perspective view of an example respiratory protective device in accordance with some example embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The term "electronically coupled," "electronically coupling," "electronically couple," "in communication with," "in electronic communication with," or "connected" in the present disclosure refers to two or more elements or components being connected through wired means and/or wireless means, such that signals, electrical voltage/current, data and/or information may be transmitted to and/or received from these elements or components.

Respiratory protective devices (such as, but not limited to, masks, respirators, and/or the like) can protect our health, especially in the COVID-19 pandemic. For example, wearing a respiratory protective device can help slow the spread of the virus, and people are recommended or required to wear face masks in indoor public places and outdoors where there is a high risk of COVID-19 transmission (such as crowded events or large gatherings).

However, many respiratory protective devices are plagued by technical disadvantages and difficulties, resulting in people not wearing them even when there is infection risk. For example, many users are unable to breathe enough air through the respiratory protective device, especially when they are exercising (e.g. running). Additionally, when a user is wearing a respiratory protective device, the respiratory protective device may create an enclosed space on the user's face that has a high humidity level and/or a high temperature level. As such, the user may not feel comfortable to wear such a respiratory protective device (especially when the user is also wearing glasses and/or during summer).

PAPR (Powered Air Purifying Respirator) is an air-purifying respirator that uses a blower to force air through filter cartridges or canisters and into the breathing zone of the wearer. However, PAPR is heavy due to complex electrical and mechanical components, and its use time is very limited mainly caused by battery capacity constraints. As such, PAPR is mostly for industrial scenarios.

Various embodiments of the present disclosure overcome these technical challenges and difficulties, and provide various technical improvements and benefits. For example, various examples of the present disclosure use a humidity sensor to detect real-time relative humidity levels, and then use a fan to discharge moisture when the humidity level is more than threshold. To increase comfort, the moisture discharging process is carried out during exhalation. Therefore, different kinds of sensors (such as pressure sensors) are adopted to detect the breath cycle, or specifically the breath exhalation period.

However, fans are mechanical devices, and their speed adjustment lags their trigger signal (about 100~500 ms, referred to as lag time Δt), and people may breathe in every 2~3 seconds. For example, a user's normal breathing rate may be 16~20 breaths per minute. When a user is running, the breath rate may be 30~40 breath per minute. Without compensating the lag time Δt, user experience can decrease 10~25%. For example, at an early inhalation phase from exhalation, the fan component still pulls air out for 100~500 ms, and hence decreases comfort for the user to breaths. At an early exhalation phase from inhalation, the fan still pulls air in for 100~500 ms, and hence decreases the efficiency for discharging moisture.

In contrast, various embodiments of the present disclosure overcome the above technical challenges, provide various technical benefits and improvements, and improve user experience. For example, various embodiments of the present disclosure may form a close control loop with various electronic components. For example, embodiments of the present disclosure may provide embedded humidity sensor in an air outlet or in the enclosure space within the respiratory protective device, provide embedded pressure sensor(s) in the enclosed space within the respiratory protective device, may include integrated fans on both sides to help with air flow and reducing humidity, and may provide a microcontroller unit with firmware to control the fan speed according to signals from the humidity sensors and the pressure sensors. Various embodiments of the present disclosure use the same fan for inhalation and exhalation, and adjust fan speed and direction according to inhalation, exhalation, and humidity level. Various embodiments of the present disclosure also provide a method to use pressure sensors to detect the breath pattern to drive the fan to discharge moisture during exhalation, and provide a control algorithm to control fan speed according to humidity difference (Δrh) and calculate fan adjustment lag time (Δt) among different fan states (different speed, different rotation direction), which can improve user experience by at least 10 to 25%.

For example, based on the signals received from the pressure sensor, the microcontroller unit can measure breath rate and breath depth. Based on indications received from the humidity sensor, the microcontroller unit can measure the relative humidity in the mask. In some embodiments, the microcontroller unit determines the cycles of inhalation and exhalation based on the breath rate. In some embodiments, the microcontroller unit determines which speed for the fan to blow air in and which speed for the fan to discharge moisture out.

In some embodiments, software/algorithms stored in the microcontroller unit can compensate for the lag time of fan speed up and slow down according to the pressure sensor and humidity sensor. In some embodiments, the fan may be a 3-speeds fan (low, middle, and high) with two directions (blow air in or discharge the moisture out). For example, different fan speeds have different lag times for speeding up and slowing down. The lag time is predetermined and stored in the microcontroller unit, including the lag times for low/middle/high speed settings for blowing in, and the lag times for low/middle/high speed settings for discharging moisture out. For example, the speed up lag time might be 250 ms for the high speed setting to blow air in and the high speed setting to discharge moisture out, while the slow down lag time might be 80 ms for the low speed setting to blow air in and the low speed setting to discharge moisture out.

Referring now to FIG. 1, an example perspective view of an example respiratory protective device (also referred to as a respiratory protective equipment) 100 in accordance with some example embodiments described herein is illustrated.

In some embodiments, the example respiratory protective device 100 is in the form of a respirator or a mask. For example, as shown in FIG. 1, the example respiratory protective device 100 comprises a mask component 101 and a strap component 103.

In some embodiments, the strap component 103 may be in the form of a mask strap. For example, in some embodiments, the strap component 103 may comprise elastic material(s) such as, but not limited to, polymers, thermoplastic elastomer (TPE), and/or the like. In some embodiments, the elastic material may allow the example respiratory protective device 100 to be secured to a user's face.

In some embodiments, the strap component 103 may comprise an ear opening 105A and an ear opening 105B. When the example respiratory protective device 100 is worn by a user, the ear opening 105A and the ear opening 105B may allow the user's left ear and the right ear to pass through.

In some embodiments, the strap component 103 may be inserted through one or more strap bucket components (such as a strap bucket component 107A and a strap bucket component 107B as shown in FIG. 1). In some embodiments, the one or more strap bucket components may be in the form of one or more buckles that include, but not limited to, a tri-glide buckle), and may allow a user to adjust the length of the strap component 103 so that the example respiratory protective device 100 can be secured to a user's face.

In some embodiments, the mask component 101 is connected to the strap component 103. For example, a first end of the strap component 103 is connected to a first end of the mask component 101, and a second end of the strap component 103 is connected to a second of the mask component

101. In this example, the first end of the mask component 101 is opposite to the second end of the mask component 101. In the example shown in FIG. 1, an end of the strap component 103 may be secured to the mask component 101 via a fastener component 117 (such as, but not limited to, a snap button).

In some embodiments, the mask component 101 may be in the form of a mask or a respirator. For example, as shown in FIG. 1, the mask component 101 may comprise an outer shell component 109 and a face seal component 111.

In some embodiments, when the example respiratory protective device 100 is worn by a user, an outer surface of the outer shell component 109 is exposed to the outside environment. In some embodiments, the face seal component 111 is attached to and extends from a periphery and/or edge of the outer shell component 109 (or an inner shell component of the mask component as described herein).

In particular, the face seal component 111 may comprise soft material such as, but not limited to, silica gel. In some embodiments, when the example respiratory protective device 100 is worn by a user, the face seal component 111 is in contact with the user's face, and may seal the example respiratory protective device 100 to at least a portion of a user's face. As described above, the example respiratory protective device 100 includes strap component 103 that allows the example respiratory protective device 100 to be secured to the user's face. As such, the face seal component 111 can create at least partially enclosed (or entirely enclosed) space between at least a portion of the user's face (e.g. mouth, nostrils, etc.), details of which are described herein.

In some embodiments, the mask component 101 comprises one or more puck components that cover one or more inhalation filtration components of the example respiratory protective device 100. For example, as shown in FIG. 1, the example respiratory protective device 100 comprises a first puck component 113A that is disposed on a left side of the outer shell component 109 and a second puck component 113B that is disposed on a right side of the outer shell component 109. In such an example, the first puck component 113A covers a first inhalation filtration component that is disposed on the left side of the mask component 101, and the second puck component 113B covers a second inhalation filtration component that is disposed on the right side of the mask component 101, details of which are described herein.

In some embodiments, the mask component 101 comprises one or more key components (such as, but not limited to, the key component 115A, the key component 115B, and the key component 115C) that may allow a user to manually control the operations of the fan component of the mask component 101 and/or other devices (such as, but not limited to, earphones) that are in electronic communication with the example respiratory protective device 100.

Figure 2A:
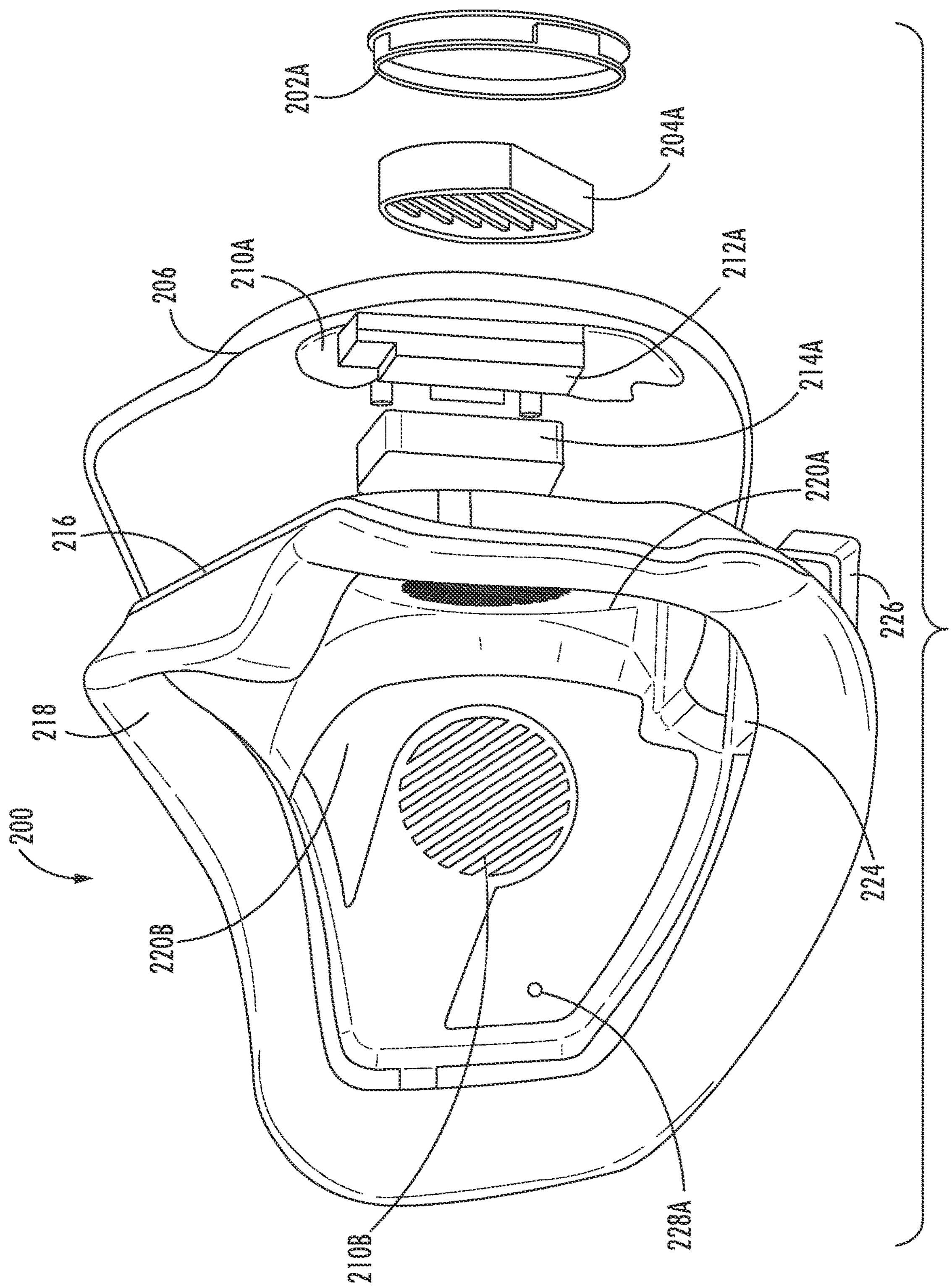
FIG. 2A illustrates an example exploded view of an example mask component in accordance with some example embodiments described herein.
Figure 2B:
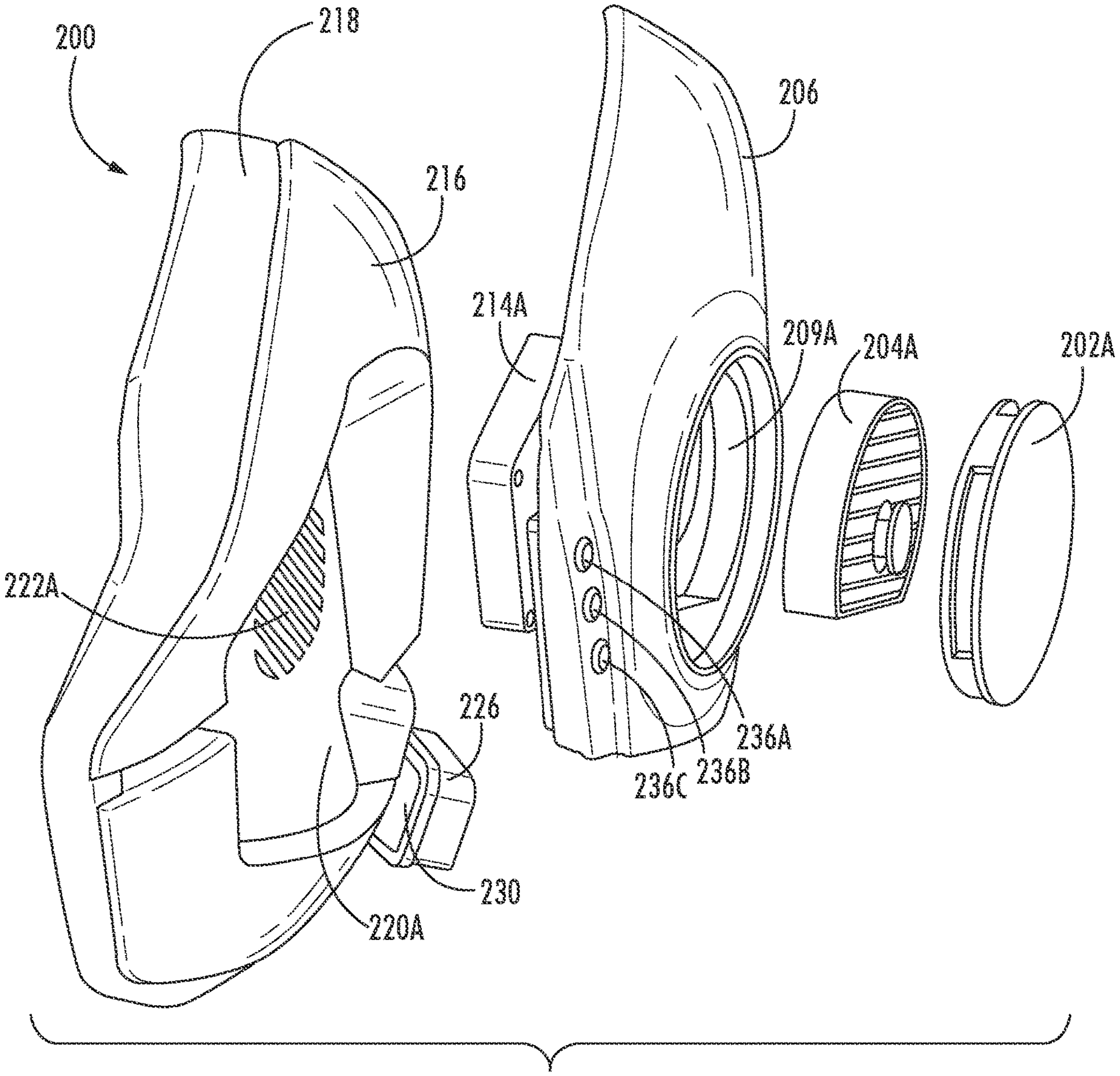
FIG. 2B illustrates another example exploded view of an example mask component in accordance with some example embodiments described herein.
Figure 2C:
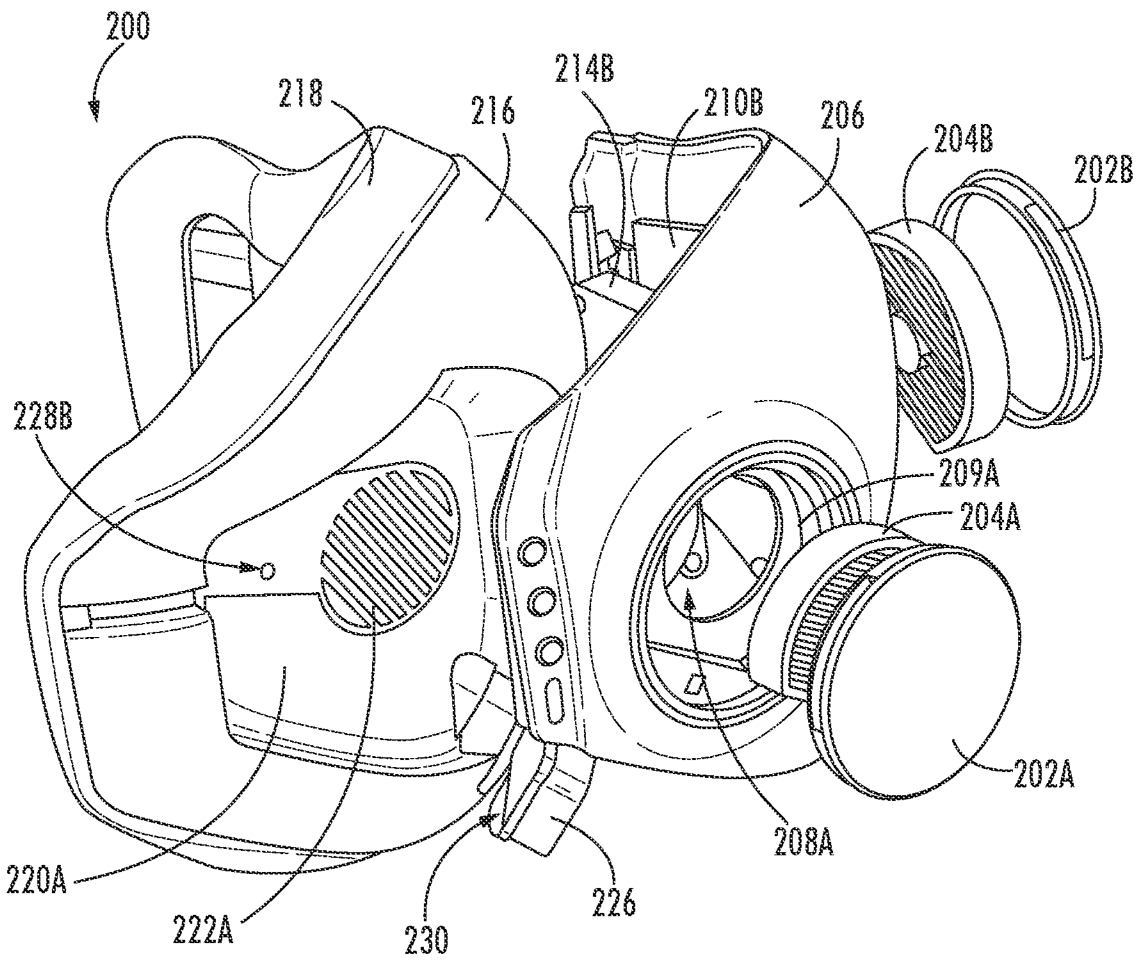
FIG. 2C illustrates another example exploded view of an example mask component in accordance with some example embodiments described herein.
Figure 2D:
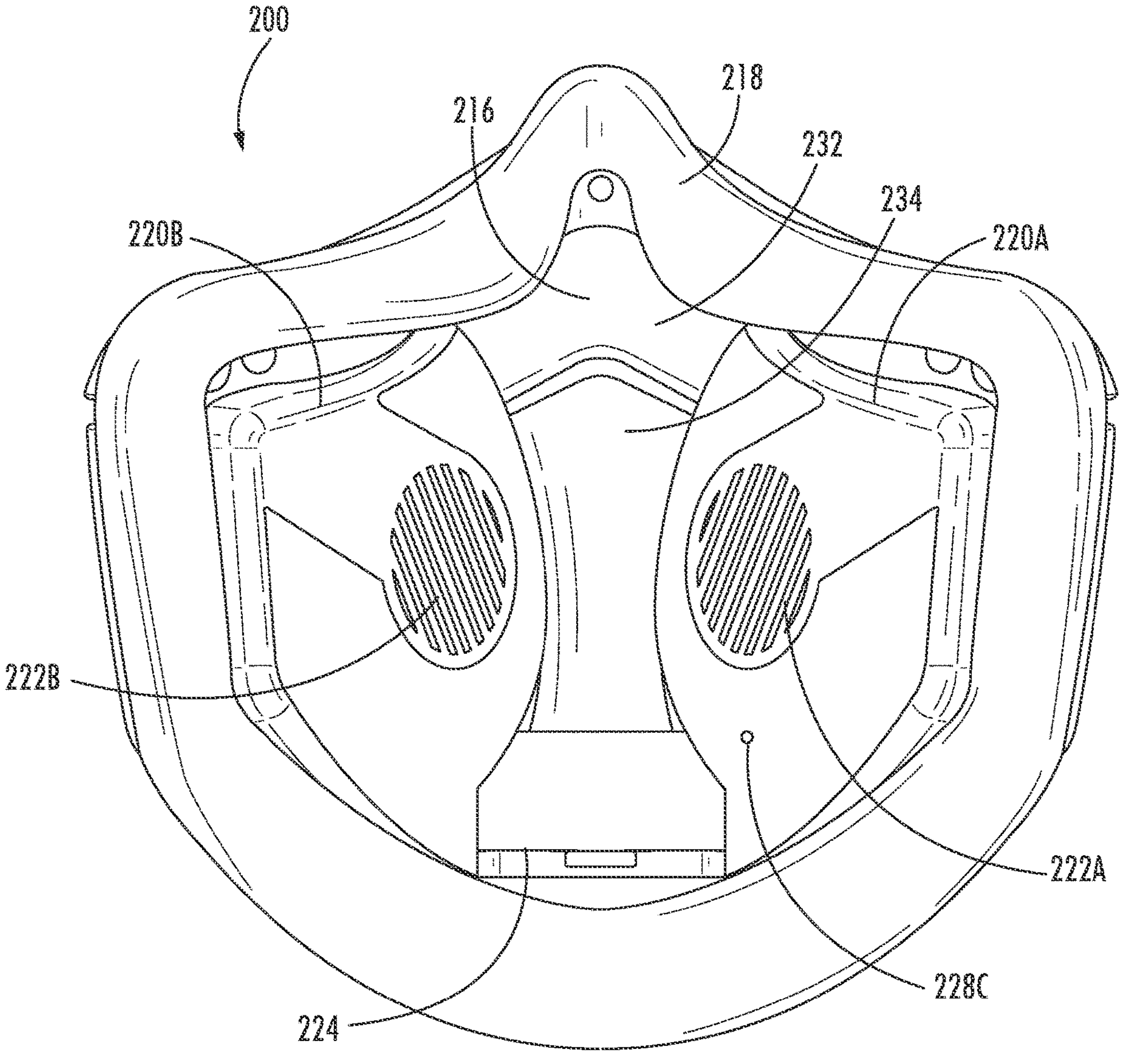
FIG. 2D illustrates an example back view of an example mask component in accordance with some example embodiments described herein.

Referring now to FIG. 2A, FIG. 2B, FIG. 2C, and FIG. 2D, examples views of an example mask component 200 in accordance with some example embodiments described herein are illustrated. In particular, FIG. 2A to FIG. 2C illustrate example exploded views of the example mask component 200, and FIG. 2D illustrates an example back view of the example mask component 200.

As shown in FIG. 2A, the mask component 200 comprises an outer shell component 206 and an inner shell component 216.

In some embodiments, the inner shell component 216 may be in a shape that is based on the contour of the user's face. In particular, when the mask component 200 is worn by a user, at least a portion of the user's face (such as, but not limited to, mouth, nostrils) are housed within the inner shell component 216.

In some embodiments, the mask component 200 may comprise a face seal component 218. In some embodiments, the face seal component 218 is attached to and extends from a periphery and/or edge of the inner shell component 216. Similar to the face seal component 111 described above in connection with FIG. 1, the face seal component 216 may comprise soft material such as, but not limited to, silica gel.

In some embodiments, when the mask component 200 is worn by a user, the face seal component 218 and an inner surface of the inner shell component 216 create an enclosed space on at least a portion of the user's face (e.g. on the mouth, nostrils, etc.).

Similar to the inner shell component 216 described above, the shape of the outer shell component 206 may be based on a contour of the user's face. In some embodiments, when the mask component 200 is assembled, the inner surface of the outer shell component 206 is secured to an outer surface of the inner shell component 216. In some embodiments, the inner shell component 216 may comprise one or more indentation portions on the outer surface of inner shell component 216.

For example, referring now to FIG. 2B, the inner shell component 216 may comprise inner shell indentation portions such as, but not limited to, an inner shell indentation portion 220A that is on a left side of the mask component 200 and an inner shell indentation portion 220B that is on a right side of the mask component 200. In particular, each of the inner shell indentation portion 220A and inner shell indentation portion 220B may be sunken or depressed from the outer surface of inner shell component 216. As such, when the outer shell component 206 is secured to the inner shell component 216, the indentation portions may create space that houses electronic components.

Referring back to FIG. 2A, in some embodiments, one or more circuit board components (such as, but not limited to, a circuit board component 210A), one or more charging circuit components (such as, but not limited to, a charging circuit component 212A), and one or more fan components (such as, but not limited to, a fan component 214A) may be disposed in the space that is defined by the inner shell indentation portion 220A and the inner surface of the outer shell component 206. Similarly, one or more circuit board components (such as, but not limited to, a circuit board component 210B), one or more charging circuit components, and one or more fan components (such as, but not limited to, a fan component 214B) may be disposed in the space that is defined by the inner shell indentation portion 220B and the inner surface of the outer shell component 206. For example, the fan component 214A may be disposed on the right side of the example respiratory protective device 200 and the fan component 214B may be disposed on the left side of the example respiratory protective device 200.

In some embodiments, the circuit board component 210A comprises a circuit board (such as, but not limited to a printed circuit board (PCB)) where other electronic components can be secured to and be in electronic communications with one another. For example, a controller component, the charging circuit component 212A and the fan component 214A may be secured to the circuit board component 210A and be in electronic communication with one another.

In some embodiments, the charging circuit component 212A may comprise a charging circuit and/or a battery that supplies power to the controller component and/or the fan component 214A. For example, the charging circuit may include a Universal Serial Bus (USB) charger circuit that is connected to a rechargeable battery.

In some embodiments, the fan component 214A may comprise an electric fan. In some embodiments, the electric fan of the fan component 214A may operate at different rotation speeds. For example, the fan component 214A may be a stepped fan that provides different, predetermined settings for the rotation speeds. Additionally, or alternatively, the fan component 214A may be a stepless fan that enables continuous adjustment of the rotation speed.

In some embodiments, the electric fan of the fan component 214A may operate at different rotational directions. For example, the fan component 214A may operate in a forward direction or a reverse direction. As an example, when the fan component 214A operates in the forward rotational direction, the electric fan of the fan component 214A may rotate counter-clockwise (when viewing from a user wearing the mask component 200) and/or may operate as a blower that draws air from outside the mask component 200 to inside the mask component 200. As another example, when the fan component 214A operates in the reverse rotational direction, the electric fan of the fan component 214A may rotate clockwise (when viewing from a user wearing the mask component 200) and/or may operate as an exhaust/ventilation fan that draws air from inside the mask component 200 to outside the mask component 200.

In some embodiments, the start time, the stop time, the rotational directions (e.g. forward direction or reverse direction) and/or the rotation speed of the electric fan of the fan component 214A may be controlled and/or adjusted by the controller component.

For example, the controller component may transmit a forward rotation start signal to the fan component 214A that causes the fan component 214A to start forward rotation (e.g. start operating as a blower that draws air from outside the mask component 200 towards inside the mask component 200). In some embodiments, the forward rotation start signal may include a forward rotation speed value that indicates the speed for the fan component 214A. Additionally, or alternatively, the controller component may transmit a forward rotation stop signal to the fan component 214A that causes the fan component 214A to stop forward rotation.

Additionally, or alternatively, the controller component may transmit a reverse rotation start signal to the fan component 214A that causes the fan component 214A to start reverse rotation (e.g. start operating as an exhaust fan that draws air from inside the mask component 200 towards outside the mask component 200). In some embodiments, the reverse rotation start signal may include a reverse rotation speed value that indicates the speed for the fan component 214A. Additionally, or alternatively, the controller component may transmit a reverse rotation stop signal to the fan component 214A that causes the fan component 214A to stop reverse rotation.

Referring now to FIG. 2C, the mask component 200 may comprise one or more inhalation filtration components (such as, but not limited to, inhalation filtration component 204A and inhalation filtration component 204B) and one or more puck components (such as, but not limited to puck component 202A and puck component 202B).

In some embodiments, each of the one or more inhalation filtration components may comprise a filter media element that comprise filter material for filtering air. Examples of filter material include, but are not limited to, HEPA filters. In some embodiments, each of the one or more puck components may be positioned to cover one of the inhalation filtration components so as to prolong the lifespan of the mask component 200. For example, the puck component 202A may cover the inhalation filtration component 204A, and the puck component 202B may cover the inhalation filtration component 204B.

As shown in FIG. 2C, the outer shell component 206 of the example mask component 200 may comprise one or more outer shell indentation portions (such as the outer shell indentation portion 209A). In particular, each of the outer shell indentation portion 209A may be sunken or depressed from the outer surface of outer shell component 206. In some embodiments, one or more inhalation filtration components may be disposed in the outer shell indentation portions. For example, as shown in FIG. 2C, an inhalation filtration component 204A is disposed in the outer shell indentation portion 209A.

In some embodiments, each of the one or more outer shell indentation portions may comprise an air inlet opening, and each of the one or more inner shell indentation portions may comprise one or more air inlet slots. In some embodiments, when the mask component 200 is assembled and in use, the air inlet opening on the outer shell indentation portion is aligned with the one or more air inlet slots on the inner shell indentation portion.

For example, as shown in FIG. 2C, the air inlet opening 208A on the outer shell indentation portion 209A of the outer shell component 206 is aligned with the air inlet slots 222A on the inner shell indentation portion 220A of the inner shell component 216.

In this example, when the mask component 200 is worn by a user and the user inhales, air is drawn from the outside environment and travels through the inhalation filtration component 204A, through the air inlet opening 208A, through the air inlet slots 222A, and arrive at the user's mouth or nostrils. As described above and shown in FIG. 2A and FIG. 2B, the fan component 214A is disposed on the inner shell indentation portion 220A (where the air inlet slots 222A are located). In some embodiments, when the user inhales, the fan component 214A may operate in a forward direction that draws air from outside the mask component 200 towards inside the mask component 200, thereby facilitating the inhaling of the user.

Referring now to FIG. 2D, an example back view of the example mask component 200. In particular, FIG. 2D illustrates the view of the example mask component 200 when it is worn by a user and viewed by the user.

As shown in FIG. 2D, the example mask component 200 may comprise air inlet slots 222A that are located on the middle right side of the inner shell component 216, and air inlet slots 222B that are located on the middle left side of the inner shell component 216. For example, the inner surface 232 of the inner shell component 216 may comprise a nose portion 234, where a user may put his or her nose when the mask component 200 is worn. In this example, the air inlet slots 222A may be located to the right of the nose portion 234, and the air inlet slots 222B may be located to the left of the nose portion 234.

In some embodiments, the example mask component 200 may comprise an outlet opening 224 that is on a middle bottom portion of the inner shell component 216. In some embodiments, the outlet opening 224 may be located corresponding to the position of the user's mouth. For example, when a user exhales, the breath may be released through the outlet opening 224.

As shown in FIG. 2A to FIG. 2C, an exhalation filtration component 226 may be connected to the inner shell component 216 at the outlet opening 224. For example, the exhalation filtration component 226 may cover the outlet opening 224. In some embodiments, the exhalation filtration component 226 may comprise a filter media element that comprise filter material for filtering air. Examples of filter material include, but are not limited to, HEPA filters. As such, the breath that is exhaled by the user may be filtered before it is released from inside the mask component 200 to the outside environment.

In some embodiments, the exhalation filtration component 226 may comprise a humidity component 230 that at least partially covers the outlet opening 224 of the inner shell component 216. The humidity sensor component 230 may comprise a humidity sensor that may, for example but not limited to, detect humidity levels within the enclosed space and/or in the breath exhaled by the user. Examples of the humidity sensor component 230 include, but are not limited to, capacitive humidity sensors, resistive humidity sensors, thermal humidity sensors, and/or the like. In some embodiments, the humidity sensor component 230 is in electronic communication with the controller component, and may transmit humidity indications to the controller component indicating the detected humidity levels (for example, relative humidity levels).

In some embodiments, the mask component 200 may comprise one or more pressure sensor components. As described above and as shown in FIG. 2B, when the mask component 200 is worn by a user, the face seal component 218 and an inner surface 232 of the inner shell component 216 create an enclosed space on at least a portion of the user's face (e.g. on the mouth, nostrils, etc.). In some embodiments, a pressure sensor component may comprise a pressure sensor that detects the air pressure within this enclosed space. Examples of the pressure sensor components include, but are not limited to, resistive air pressure transducer or strain gauge, capacitive air pressure transducer, inductive air pressure transducer, and/or the like.

For example, as shown in FIG. 2A, a pressure sensor component 228A may be disposed on an inner surface of the inner shell component 216. Additionally, or alternatively, as shown in FIG. 2C, a pressure sensor component 228B may be disposed on the inner shell indentation portion 220A of the inner shell component 216. Additionally, or alternatively, as shown in FIG. 2D, a pressure sensor component 228C may be disposed on the inner surface of the inner shell component 216. The pressure sensor component 228A, the pressure sensor component 228B, and/or the pressure sensor component 228C may detect the air pressure within the enclosed space defined by the face seal component 218 and the inner shell component 216 on at least a portion of the user's face.

In some embodiments, the one or more pressure sensor components are in electronic communication with the controller component, and may transmit air pressure indications to the controller component indicating the detected air pressure. For example, each of the air pressure indications may comprise an air pressure value that corresponds to the air pressure in the enclosed space as defined by the face seal component 218 and the inner shell component 216.

While the description above provides an example mask component, it is noted that the scope of the present disclosure is not limited to the description above. In some examples, an example mask component may comprise one or more additional and/or alternative elements. For example, an example mask component may comprise less than two or more than two fan components. Additionally, or alternatively, an example mask component may comprise less than two or more than two inhalation filtration components.

In some embodiments, mask component 200 may include one or more key components, such as, but not limited to, a key component 236A, a key component 236B, and a key component 236C. In some embodiments, the one or more key components may be disposed on an outer surface of the outer shell component 206. Each of the one or more key components may provide a button that allow a user to control and/or adjust the operations of various electronic components described herein (such as, but not limited to, fan components, earphones, and/or the like.)

Figure 3:
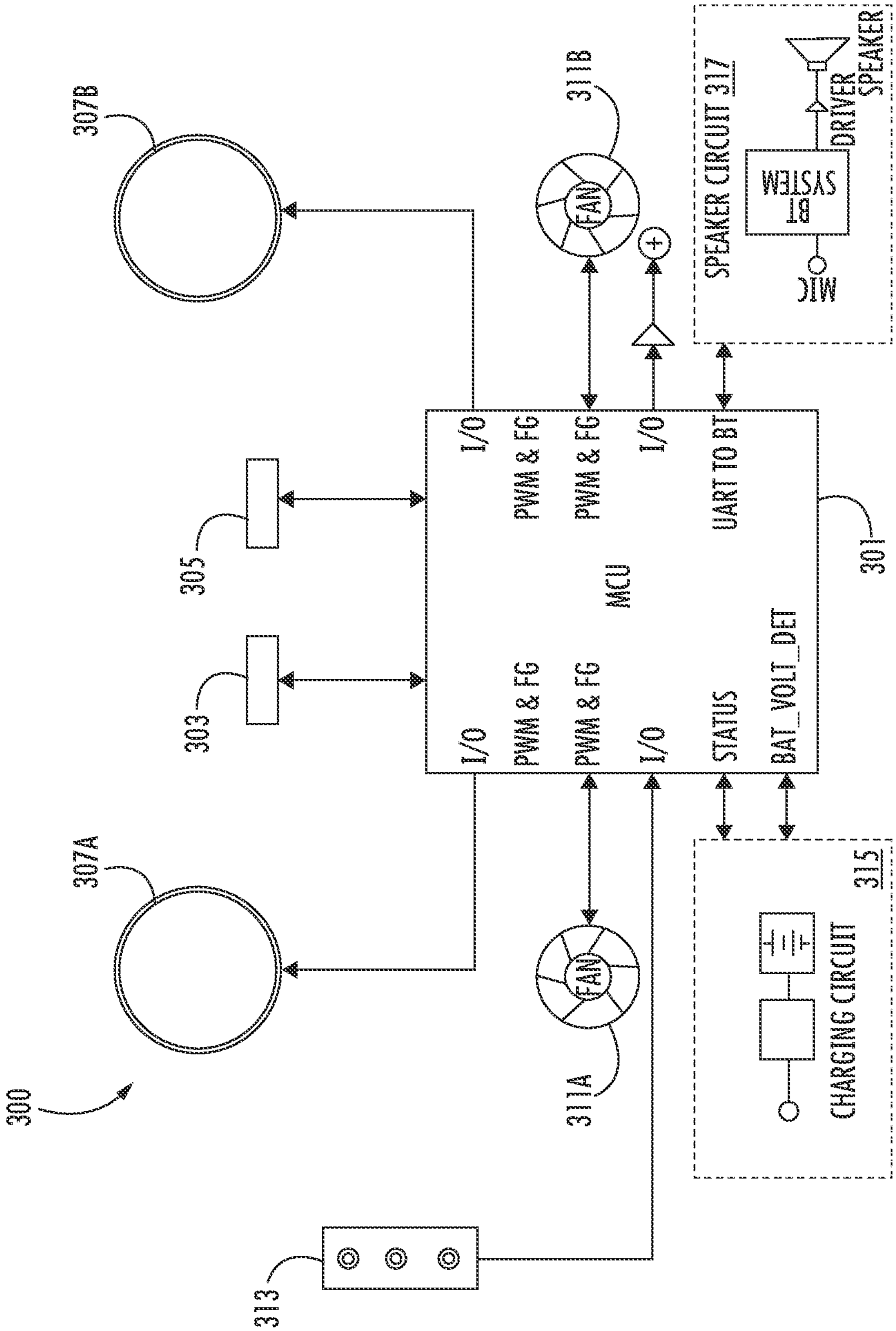
FIG. 3 illustrates an example circuit diagram of an example respiratory protective device in accordance with some example embodiments described herein.

Referring now to FIG. 3, an example circuit diagram of an example respiratory protective device 300 in accordance with some example embodiments described herein is illustrated. In particular, FIG. 3 illustrates example electronic components of an example respiratory protective device in accordance with various example embodiments of the present disclosure.

As shown in FIG. 3, the example respiratory protective device 300 may comprise a controller component 301 that is in electronic communications with other components such as, but not limited to, the pressure sensor component 303, the humidity sensor component 305, a light 307A and a light 307B that are disposed on one or more puck components, fan component 311A, fan component 311B, key components 313, and/or the speaker circuit 317.

In some embodiments, the controller component 301 may be embodied as means including one or more microprocessors with accompanying digital signal processor(s), one or more processor(s) without an accompanying digital signal processor, one or more coprocessors, one or more multicore processors, one or more controllers, processors, one or more computers, various other processing elements including integrated circuits such as, for example, an application specific integrated circuit (ASIC), programmable logic controller (PLC) or field programmable gate array (FPGA), or some combination thereof. Accordingly, although illustrated in FIG. 3 as a single processor, in an embodiment, the controller component 301 may include a plurality of processors and signal processing modules. The plurality of processors may be in operative communication with each other and may be collectively configured to perform one or more functionalities as described herein. In an example embodiment, the controller component 301 may be configured to execute instructions stored in a memory circuitry or otherwise accessible to the controller component.

Whether configured by hardware, firmware/software methods, or by a combination thereof, the controller component 301 may include an entity capable of performing operations according to embodiments of the present disclosure while configured accordingly. Thus, for example, when the controller component 301 is embodied as an ASIC, PLC, FPGA or the like, the controller component 301 may include specifically configured hardware for conducting one or more operations described herein. Alternatively, as another example, when the controller component 301 is embodied as an executor of instructions, such as may be stored in the memory circuitry, the instructions may specifically configure the controller component 301 to perform one or more algorithms and operations described herein.

Thus, the controller component 301 used herein may refer to a programmable microprocessor, microcomputer or multiple processor chip or chips that can be configured by software instructions (applications) to perform a variety of functions, including the functions of the various embodiments described above.

In some embodiments, the memory circuitry may include suitable logic, circuitry, and/or interfaces that are adapted to store a set of instructions that is executable by the controller component 301 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the memory circuitry may be integrated with the controller component 301 on a single chip, without departing from the scope of the disclosure.

In some embodiments, the pressure sensor component 303 may transmit air pressure indications to the controller component 301. As described above, each of the air pressure indications may comprise an air pressure value that corresponds to the air pressure in the enclosed space as defined by the face seal component 218 and the inner shell component 216.

In some embodiments, the humidity sensor component 305 may transmit humidity indications to the controller component 301. As described above, the humidity indications may indicate relative humidity levels within the example respiratory protective device. For example, the humidity indications may indicate relative humidity levels within the enclosed space defined by the face seal component and the inner shell component of the respiratory protective device on at least a portion of the user's face.

In some embodiments, the controller component 301 may transmit control signals to the light 307A and/or the light 307B so as to adjust the color and/or intensity of the light emitted by the light 307A and/or the light 307B.

In some embodiments, the controller component 301 may transmit forward rotation start signals to the fan component 311A and/or the fan component 311B to cause the fan component 311A and/or the fan component 311B to start forward rotation. In some embodiments, the controller component 301 may transmit forward rotation stop signals to the fan component 311A and/or the fan component 311B to cause the fan component 311A and/or the fan component 311B to stop forward rotation.

In some embodiments, the controller component 301 may transmit reverse rotation start signals to the fan component 311A and/or the fan component 311B to cause the fan component 311A and/or the fan component 311B to start reverse rotation. In some embodiments, the controller component 301 may transmit reverse rotation stop signals to the fan component 311A and/or the fan component 311B to cause the fan component 311A and/or the fan component 311B to stop reverse rotation.

In some embodiments, the controller component 301 is in electronic communication with the key components 313. For example, when a user presses a button on the key components 313, the key components 313 may transmit a signal to the controller component 301.

In some embodiments, the controller component 301 is in electronic communication with the speaker circuit 317. For example, the controller component 301 may transmit control signals to an earphone in the speaker circuit 317 so as to adjust volume, noise canceling mode, and/or the like of the earphone.

In some embodiments, the charging circuit 315 supplies power to controller component 301 and one or more other electronic components shown in FIG. 3 (such as, but not limited to, the fan component 311A and the fan component 311B).

Referring now to FIG. 4 to FIG. 10, example diagrams illustrating example methods in accordance with various embodiments of the present disclosure are illustrated.

It is noted that each block of the flowchart, and combinations of blocks in the flowchart, may be implemented by various means such as hardware, firmware, circuitry and/or other devices associated with execution of software including one or more computer program instructions. For example, one or more of the steps/operations described in FIG. 4, FIG. 5, FIG. 7, FIG. 8, and FIG. 9 may be embodied by computer program instructions, which may be stored by a non-transitory memory of an apparatus employing an embodiment of the present disclosure and executed by a processing circuitry in the apparatus. For example, these computer program instructions may direct the example controller component 301 described above in connection with FIG. 3 to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Figure 4:
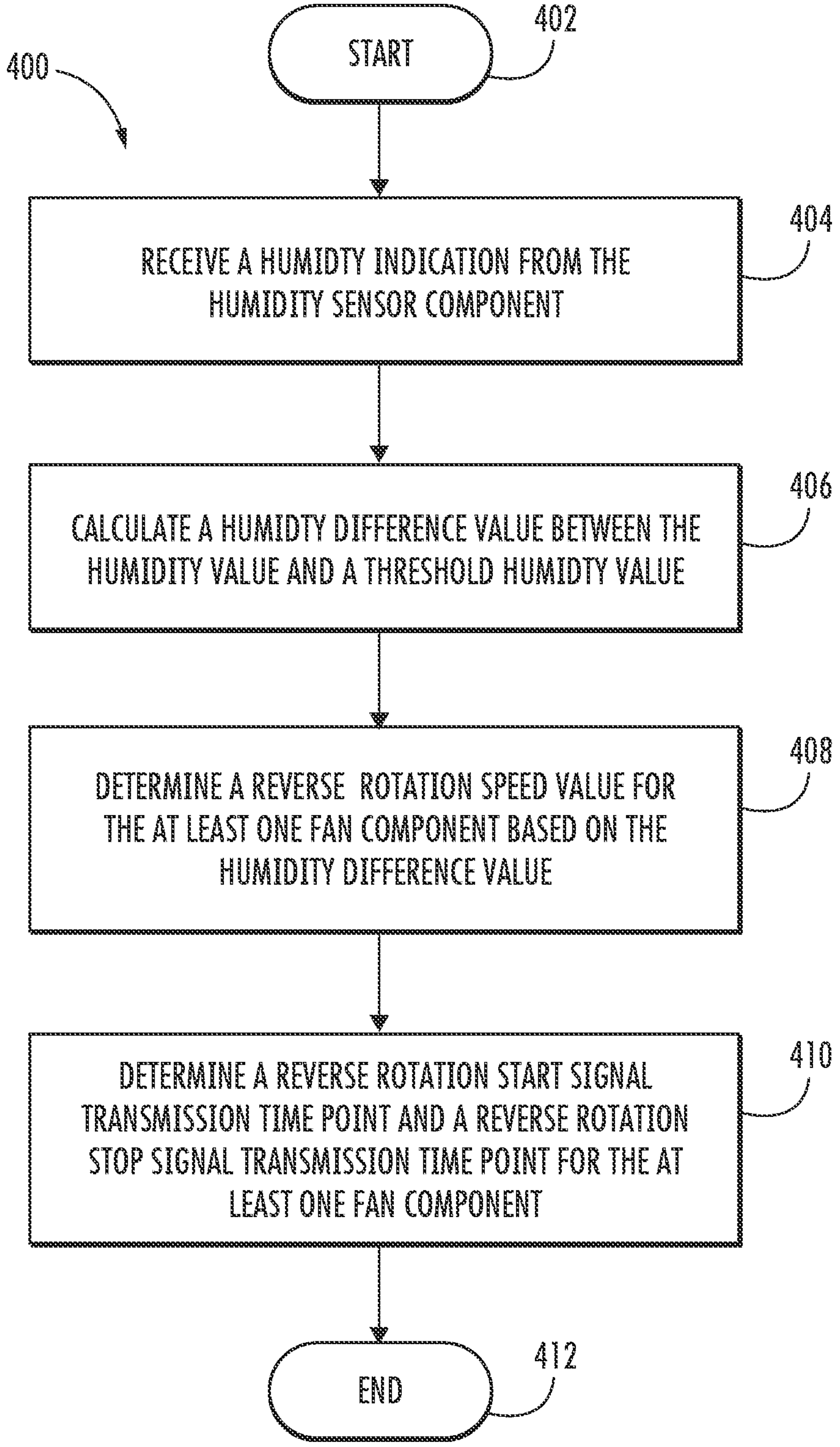
FIG. 4 illustrates an example method of reducing humidity in an example respiratory protective device in accordance with some example embodiments described herein.

Referring now to FIG. 4, an example method 400 of reducing humidity level in an example respiratory protective device in accordance with some example embodiments described herein is illustrated.

In FIG. 4, the example method 400 starts at step/operation 402. In some embodiments, subsequent to and/or in response to step/operation 402, the example method 400 proceeds to step/operation 404. At step/operation 404, a controller component (such as, but not limited to, the controller component 301 of the example respiratory protective device 300 described in connection with FIG. 3 above) may receive a humidity indication from the humidity sensor component.

In some embodiments, the humidity indication comprises a humidity value. In some embodiments, the humidity value is a relative humidity value. As described above, when an example respiratory protective device in accordance with various example embodiments of the present disclosure is worn by the user, an enclosed space is created between at least a portion of the user's face (e.g. nose, nostrils, etc.), the face seal component, and an inner surface of the inner shell component. In some embodiments, the humidity sensor component may be positioned in the exhalation filtration component to detect the humidity level of air within this enclosed space (and/or air that is exhaled by the user). Additionally, or alternatively, the humidity sensor component may be positioned in the inhalation filtration component to detect the humidity level of air within this enclosed space (and/or air that is to be inhaled by the user).

For example, when a user breathes within the enclosed space, the air may flow within the enclosed space, and the humidity sensor component may detect the humidity value that indicates the humidity level of air that is in the enclosed space, generate a humidity indication, and transmit the air pressure indication to the controller component.

Referring back to FIG. 4, subsequent to and/or in response to step/operation 404, the example method 400 proceeds to step/operation 406. At step/operation 406, a controller component (such as, but not limited to, the controller component 301 of the example respiratory protective device 300 described in connection with FIG. 3 above) may calculate a humidity difference value between the humidity value and a threshold humidity value.

In some embodiments, the threshold humidity value corresponds to a baseline level of humidity. In some embodiments, when the humidity level in the enclosed space is at this baseline level, a user feels comfortable breathing through the respiratory protective device. If the humidity level is above this level, the user no longer feels comfortable breathing through the respiratory protective device.

In some embodiments, the threshold humidity value is determined or set by the controller component. In some embodiments, the threshold humidity value is a relative humidity value. In some embodiments, the threshold humidity value is a range of relative humidity values.

In some embodiments, the controller component may select the threshold humidity value from a range of 45% to 65% (which may be suitable for most people). In some embodiments, the controller component may select the threshold humidity value from a range of 45% to 70%. In some embodiments, the controller component may set the threshold humidity value at 70%. Additionally, or alternatively, the controller component may set the threshold humidity value at other value(s) and/or value range(s).

In some embodiments, if the humidity value as detected by the humidity sensor component (e.g. the humidity level in the enclosed space) is above the threshold humidity value, the user may not feel comfortable breathing while wearing the respiratory protective device. As such, the controller component calculates a humidity difference value by subtracting the threshold humidity value from the humidity value as detected by the humidity sensor component and received at step/operation 404. In some embodiments, the humidity difference value corresponds to the amount of humidity that needs to be decreased in the enclosed space so that the user can feel comfortable breathing again.

In some embodiments, if the humidity value as detected by the humidity sensor component (e.g. the humidity level in the enclosed space) is below the threshold humidity value, the user may feel comfortable breathing while wearing the respiratory protective device. In such examples, the controller component may determine that a reverse rotation of the fan component is not needed, and may forgo step/operation 408 and step/operation 410 so that the example method 400 ends.

Referring back to FIG. 4, subsequent to and/or in response to step/operation 406, the example method 400 proceeds to step/operation 408. At step/operation 408, a controller component (such as, but not limited to, the controller component 301 of the example respiratory protective device 300 described in connection with FIG. 3 above) may determine a reverse rotation speed value for the at least one fan component based on the humidity difference value.

In some embodiments, the reverse rotation speed value is a value for a speed at which one or more fan components of the example respiratory protective device is set to operate in the reverse rotation mode (e.g. push air from inside the example respiratory protective device to outside the example respiratory protective device). In some embodiments, the controller component may determine the reverse rotation speed value for at least one fan component based on the humidity difference value that is calculated at step/operation 406.

As described above, the humidity difference value corresponds to the amount of humidity that needs to be decreased in the enclosed space. If the humidity difference value increases (e.g. the air in the enclosed space becomes more humid), the reverse rotation speed value can be increased so that more air can be drawn from inside the example respiratory protective device to outside the example respiratory protective device to reduce the humidity level. If the humidity difference value decreases (e.g. the air in the enclosed space becomes less humid), the reverse rotation speed value can be decreased so that less air is drawn from inside the example respiratory protective device to outside the example respiratory protective device to reduce humidity while preserving power. If the humidity difference value is below zero (e.g. the humidity value is less than the threshold humidity value), the reverse rotation speed value becomes zero as the user is feeling comfortable enough breathing through the respiratory protective device.

As such, various embodiments of the present disclosure may improve user experience while wearing the example respiratory protective device.

Referring back to FIG. 4, subsequent to and/or in response to step/operation 408, the example method 400 proceeds to step/operation 410. At step/operation 410, a controller component (such as, but not limited to, the controller component 301 of the example respiratory protective device 300 described in connection with FIG. 3 above) may determine a reverse rotation start signal transmission time point and a reverse rotation stop signal transmission time point for the at least one fan component.

In some embodiments, the controller component determines the reverse rotation start signal transmission time point and the reverse rotation stop signal transmission time point for the at least one fan component based at least in part on the reverse rotation speed value.

In the present disclosure, the term "reverse rotation start signal transmission time point" refers to a time at which the controller component transmits a reverse rotation start signal to one or more fan components of the example respiratory protective device so that the one or more fan components can start reverse rotation. In some embodiments, the reverse rotation start signal comprises the reverse rotation speed value determined at step/operation 408.

In some embodiments, the fan component may receive the reverse rotation start signal when it is idle (e.g. when its rotation speed is zero) or when it is running in the forward rotation mode. As such, there is a time delay between the reverse rotation start signal transmission time and the time when the fan component reaches the reverse rotation speed value. In some examples, the controller component may determine when a user starts exhaling (for example, based on the breath rate of the user as detected by a pressure sensor component), and may set the reverse rotation start signal transmission time point prior to the time when a user starts exhaling so as to avoid the time delay. In such examples, when the user starts exhaling, the fan component can operate at a speed corresponding to the reverse rotation speed value.

While the description above provides an example of determining the reverse rotation start signal transmission time point, it is noted that the scope of the present disclosure is not limited to the description above. In some examples, the controller component may set the reverse rotation start signal transmission time point as the time point when the user starts exhaling.

In the present disclosure, the term "reverse rotation stop signal transmission time point" refers to a time at which the controller component transmits a reverse rotation stop signal to one or more fan components of the example respiratory protective device so that the one or more fan components can stop reverse rotation.

In some embodiments, the fan component may receive the reverse rotation stop signal when it is running (e.g. when it is at the reverse rotation speed). As such, there is a time delay between the reverse rotation stop signal transmission time and the time when the fan component stops running.

In some examples, the controller component may determine when a user completes exhaling and starts inhaling (for example, based on the breath rate of the user as detected by a pressure sensor component), and may set the reverse rotation stop signal transmission time point prior to the time when a user starts inhaling so as to avoid the time delay. In such examples, when the user starts inhaling, the fan component is not running in the reverse rotation mode or may be idle.

Referring back to FIG. 4, subsequent to and/or in response to step/operation 410, the example method 400 proceeds to step/operation 412 and ends.

Figure 5:
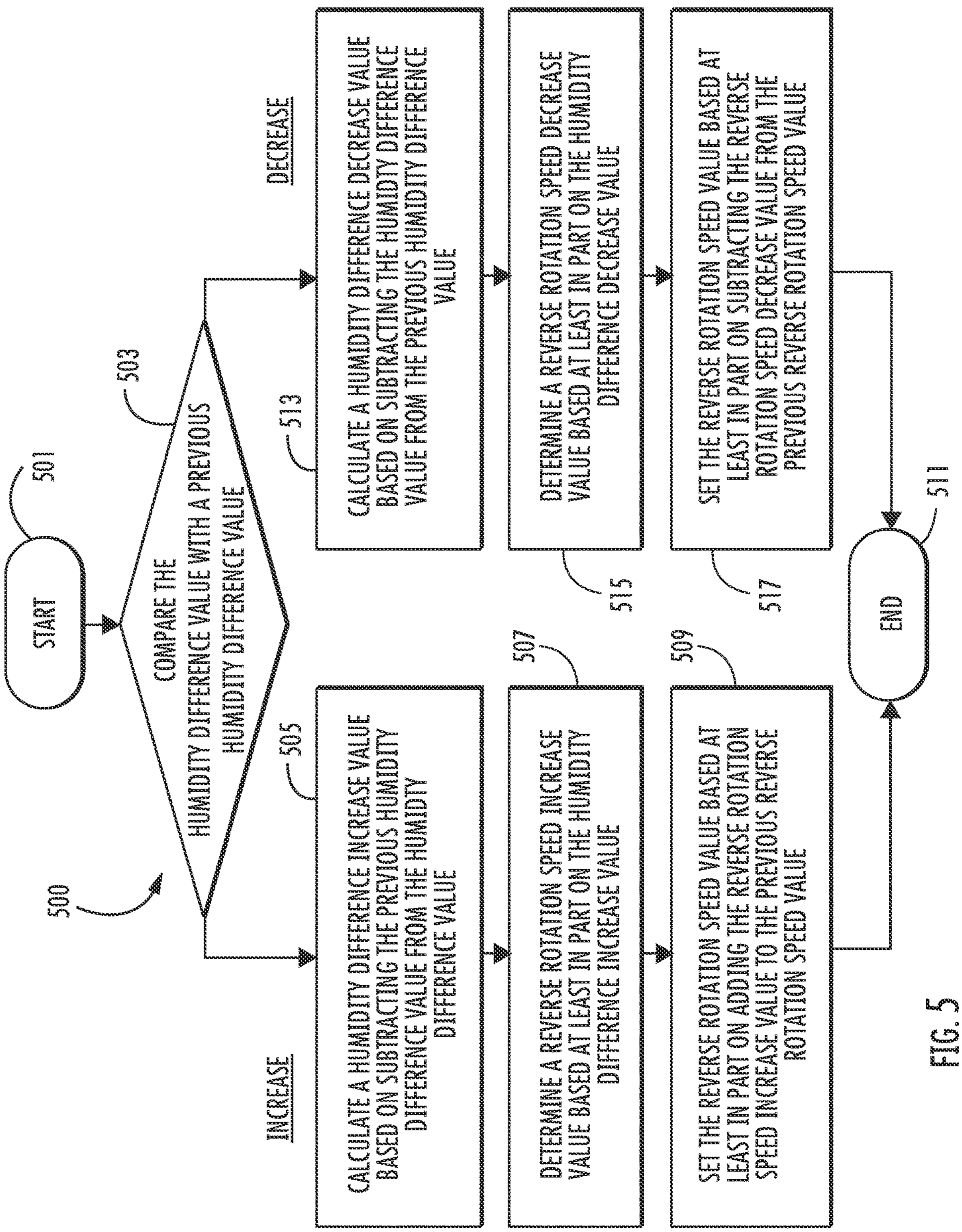
FIG. 5 illustrates an example method of setting an example reverse rotation speed value for an example fan component in accordance with some example embodiments described herein.

Referring now to FIG. 5, an example method 500 of setting an example reverse rotation speed value for an example fan component in accordance with some example embodiments described herein is illustrated.

In FIG. 5, the example method 500 starts at step/operation 501. In some embodiments, subsequent to and/or in response to step/operation 501, the example method 500 proceeds to step/operation 503. At step/operation 503, a controller component (such as, but not limited to, the controller component 301 of the example respiratory protective device 300 described in connection with FIG. 3 above) may compare the humidity difference value with a previous humidity difference value.

In some embodiments, the humidity sensor component may continuously measure the humidity values, and may continuously calculate humidity difference values by subtracting the threshold humidity value from the humidity values. In some embodiments, the previous humidity difference value is calculated based on a previous humidity value that was measured at a previous time point prior to a current time point when a current humidity value is measured. In some embodiments, the humidity difference value is calculated based on the current humidity value.

In some embodiments, the previous humidity difference value is associated with a previous reverse rotation speed value of the at least one fan component. For example, the previous reverse rotation speed value indicates a reverse rotation speed of the at least one fan component at the previous time point. In some embodiments, the previous reverse rotation speed value is a default speed value of the at least one fan component.

In some embodiments, the controller component may compare the humidity difference value with the previous humidity difference value, and may determine whether the humidity difference value increases or decreases from the previous humidity difference value.

For example, when a user of the example respiratory protective device enters an environment that has a higher humidity level, the humidity difference value may increase. When the user wearing the example respiratory protective device enters an environment that has a lower humidity level, the humidity difference value may decrease.

Referring back to FIG. 5, if, at step/operation 503, the controller component determines that the humidity difference value increases from the previous humidity difference value, the example method 500 proceeds to step/operation 505. At step/operation 505, a controller component (such as, but not limited to, the controller component 301 of the example respiratory protective device 300 described in connection with FIG. 3 above) may calculate a humidity difference increase value based on subtracting the previous humidity difference value from the humidity difference value.

For example, the humidity difference value may be 80%, and the previous humidity difference value may be 75%. In this example, the controller component determines the humidity difference value increases from the previous humidity difference value, may calculate the humidity difference increase value by subtracting 75% from 80%, and may determine that the humidity difference increase value is 5%.

Referring back to FIG. 5, subsequent to and/or in response to step/operation 505, the example method 500 proceeds to step/operation 507. At step/operation 507, a processing circuitry (such as, but not limited to, the controller component 301 of the example respiratory protective device 300 described in connection with FIG. 3 above) may determine a reverse rotation speed increase value based at least in part on the humidity difference increase value.

As described above, the increase in humidity difference value indicates that the air is becoming more humid, and therefore the controller component may increase the reverse rotation speed of the fan component so that more air can be pulled out of the respiratory protective device (e.g. the mask component). In some embodiments, the increase in the reverse rotation speed (as reflected in the reverse rotation speed increase value) is proportional to the increase in humidity (as reflected in the humidity difference increase value).

For example, the controller component may multiply the reverse rotation speed increase value by a predetermined increase unit value to determine the reverse rotation speed increase value. Additionally, or alternatively, one or more predetermined reverse rotation speed increase values may be provided to the controller component. Each predetermined reverse rotation speed increase value may be associated with a range of humidity difference increase values, and the controller component may determine a range of humidity difference increase values that the humidity difference increase value (determined at step/operation 505) falls within, and may select the predetermined reverse rotation speed increase value that corresponds to the range of humidity difference increase values as the reverse rotation speed increase value.

Continuing from the example above, the controller component may multiply the humidity difference increase value 5% by an example predetermined increase unit value 400 to determine the reverse rotation speed increase value as 20 RPM.

Referring back to FIG. 5, subsequent to and/or in response to step/operation 507, the example method 500 proceeds to step/operation 509. At step/operation 509, a processing circuitry (such as, but not limited to, the controller component 301 of the example respiratory protective device 300 described in connection with FIG. 3 above) may set the reverse rotation speed value based at least in part on adding the reverse rotation speed increase value to the previous reverse rotation speed value.

Continuing from the example above, the previous reverse rotation speed value may be 200 RPM, and the reverse rotation speed increase value is 20 RPM. In this example, the controller component may set the reverse rotation speed value as 220 RPM.

As illustrated in the above example, in response to determining an increase in the humidity difference value, the controller component may increase the reverse rotation speed so that more air can be pulled out of the example respiratory protective device.

Referring back to FIG. 5, subsequent to and/or in response to step/operation 509, the example method 500 proceeds to step/operation 511 and ends.

If, at step/operation 503, the controller component determines that the humidity difference value decreases from the previous humidity difference value, the example method 500 proceeds to step/operation 513. At step/operation 513, a controller component (such as, but not limited to, the controller component 301 of the example respiratory protective device 300 described in connection with FIG. 3 above) may calculate a humidity difference decrease value based on subtracting the humidity difference value from the previous humidity difference value.

For example, the humidity difference value may be 75%, and the previous humidity difference value may be 80%. In this example, the controller component determines the humidity difference value decreases from the previous humidity difference value, may calculate the humidity difference decrease value by subtracting 75% from 80%, and may determine that the humidity difference decrease value is 5%.

Referring back to FIG. 5, subsequent to and/or in response to step/operation 513, the example method 500 proceeds to step/operation 515. At step/operation 515, a processing circuitry (such as, but not limited to, the controller component 301 of the example respiratory protective device 300 described in connection with FIG. 3 above) may determine a reverse rotation speed decrease value based at least in part on the humidity difference decrease value.

As described above, the decrease in humidity difference value indicates that the air within the enclosed space is less humid, and therefore the controller component may decrease the reverse rotation speed of the fan component so that less air is pulled out of the respiratory protective device (e.g. the mask component) and the fan component can consume less power and be quieter. In some embodiments, the decrease in the reverse rotation speed (as reflected in the reverse rotation speed decrease value) is proportional to the decrease in humidity (as reflected in the humidity difference decrease value).

For example, the controller component may multiply the reverse rotation speed decrease value by a predetermined decrease unit value to determine the reverse rotation speed decrease value. Additionally, or alternatively, one or more predetermined reverse rotation speed decrease values may be provided to the controller component. Each predetermined reverse rotation speed decrease value may be associated with a range of humidity difference decrease values, and the controller component may determine a range of humidity difference decrease values that the humidity difference decrease value (calculated at step/operation 513) falls within, and may select the predetermined reverse rotation speed decrease value that corresponds to the range of humidity difference decrease values as the reverse rotation speed decrease value.

Continuing from the example above, the controller component may multiply the humidity difference decrease value 5% by an example predetermined decrease unit value 400 to determine the reverse rotation speed decrease value as 20 RPM.

Referring back to FIG. 5, subsequent to and/or in response to step/operation 515, the example method 500 proceeds to step/operation 517. At step/operation 517, a processing circuitry (such as, but not limited to, the controller component 301 of the example respiratory protective device 300 described in connection with FIG. 3 above) may set the reverse rotation speed value based at least in part on subtracting the reverse rotation speed decrease value from the previous reverse rotation speed value.

Continuing from the example above, the previous reverse rotation speed value may be 200 RPM, and the reverse rotation speed decrease value is 20 RPM. In this example, the controller component may set the reverse rotation speed value as 180 RPM.

As illustrated in the above example, in response to determining a decrease in the humidity difference value, the controller component may decrease the reverse rotation speed so that less air is drawn into the example respiratory protective device.

Referring back to FIG. 5, subsequent to and/or in response to step/operation 517, the example method 500 proceeds to step/operation 511 and ends.

While the description above provides an example of setting the reverse rotation speed value, it is noted that the scope of the present disclosure is not limited to the description above.

For example, the fan component may be a stepped fan that provides different, predetermined settings for the rotation speed. In such an example, the controller component may assign a range of humidity difference values to each of the predetermined settings for the rotation speed. If the humidity difference value falls within a range of humidity difference values, the controller component may determine the predetermined setting for the rotation speed that corresponds to the range of humidity difference values, and set the predetermined setting as the reverse rotation speed value of the at least one fan component.

Additionally, or alternatively, the controller component may determine whether the humidity difference value is a positive number or a negative number (e.g. whether the humidity value is more than or less than the threshold humidity value). If the humidity difference value is a positive number (i.e. the humidity value is more than the threshold humidity value), the controller component may multiply the humidity difference value by a predetermined speed unit value to determine the reverse rotation speed value. If the humidity difference value is a negative number (i.e. the humidity value is less than the threshold humidity value), the controller component may set the reverse rotation speed as zero (i.e. cause the fan component to stop operating), similar to those examples described above.

Figure 6:
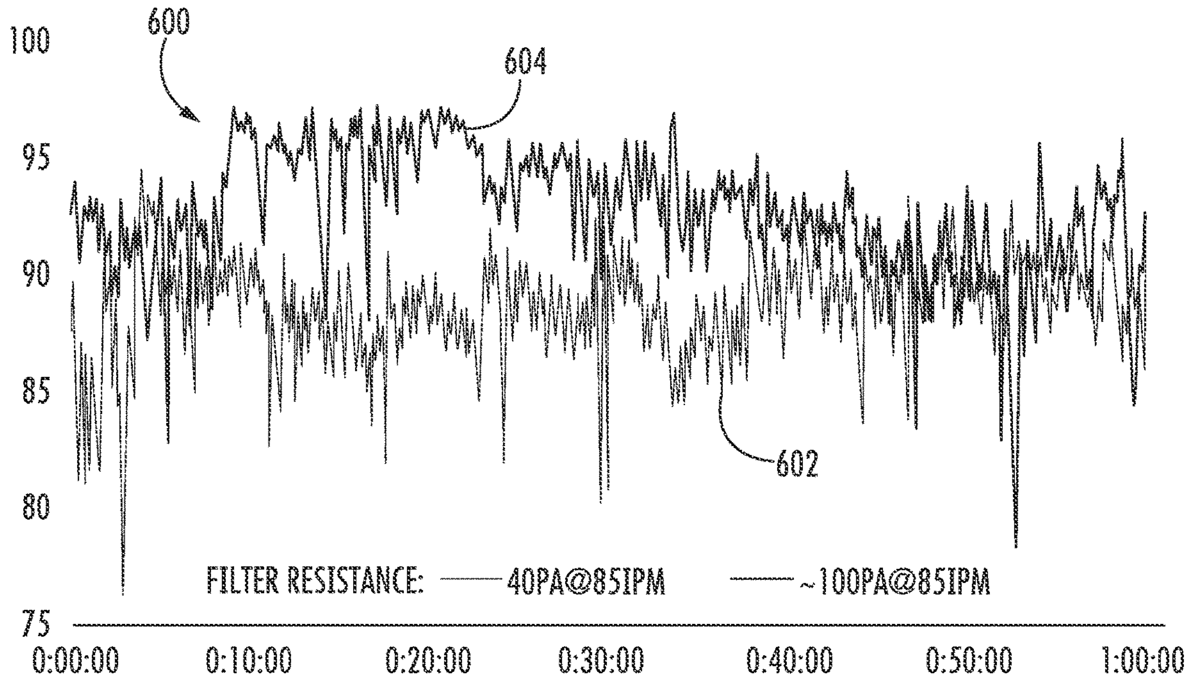
FIG. 6 illustrates an example diagram illustrating example relative humidity levels.
Figure 7:
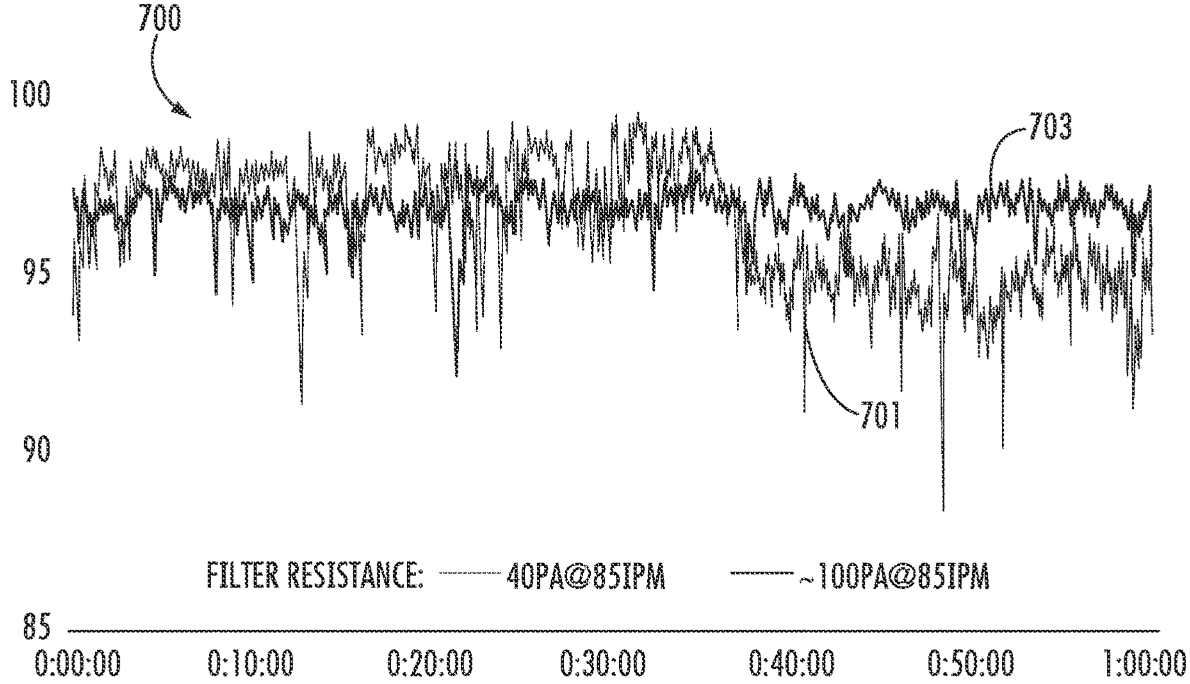
FIG. 7 illustrates an example diagram illustrating example relative humidity levels.

As described above, various example embodiments of the present disclosure (including, but not limited to, those example methods illustrated in FIG. 4 and FIG. 5) improve user experience compared to masks that do not implement any dehumidifying techniques). Referring now to FIG. 6 and FIG. 7, example diagrams 600 and 700 illustrate example relative humidity levels within a mask that does not implement any dehumidifying techniques.

In FIG. 6, a user is wearing a mask that does not implement any dehumidifying techniques while sitting down in an environment at 23 degrees Celsius and 52% relative humidity. The example diagram 600 illustrates changes in relative humidity (the y-axis) in relationship to time (the x-axis). The curve 602 illustrates the relative humidity values at 40 pascal (Pa) with an air low of 85 liters per minute (LPM) through the mask. The curve 604 illustrates the relative humidity values at 100 Pa with an air low of 85 LPM through the mask.

In FIG. 7, a user is wearing a mask that does not implement any dehumidifying techniques while walking at 2 kilometers per hour in an environment at 23 degrees Celsius and 52% relative humidity. The example diagram 700 illustrates changes in relative humidity (the y-axis) in relationship to time (the x-axis). The curve 701 illustrates the relative humidity values at 40 Pa with an air low of 85 LPM through the mask. The curve 703 illustrates the relative humidity values at 100 Pa with an air low of 85 LPM through the mask.

As shown in FIG. 6 and FIG. 7, when a user wears a mask that does not implement any dehumidifying techniques, the humidity level within the mask may be significantly increased (for example, relative humidity can reach more than 85% or even 95% when the user is sitting down in an environment that has a 52% relative humidity level, which can cause discomfort of the user wearing the mask. In contrast, by implementing various example embodiments described herein (for example, causing the fan component to reverse rotate and pulls air from within the mask component to outside of the mask component, and setting the speed based on the humidity level), various examples of the present disclosure can improve user experience while wearing a respiratory protective device.

Figure 8:
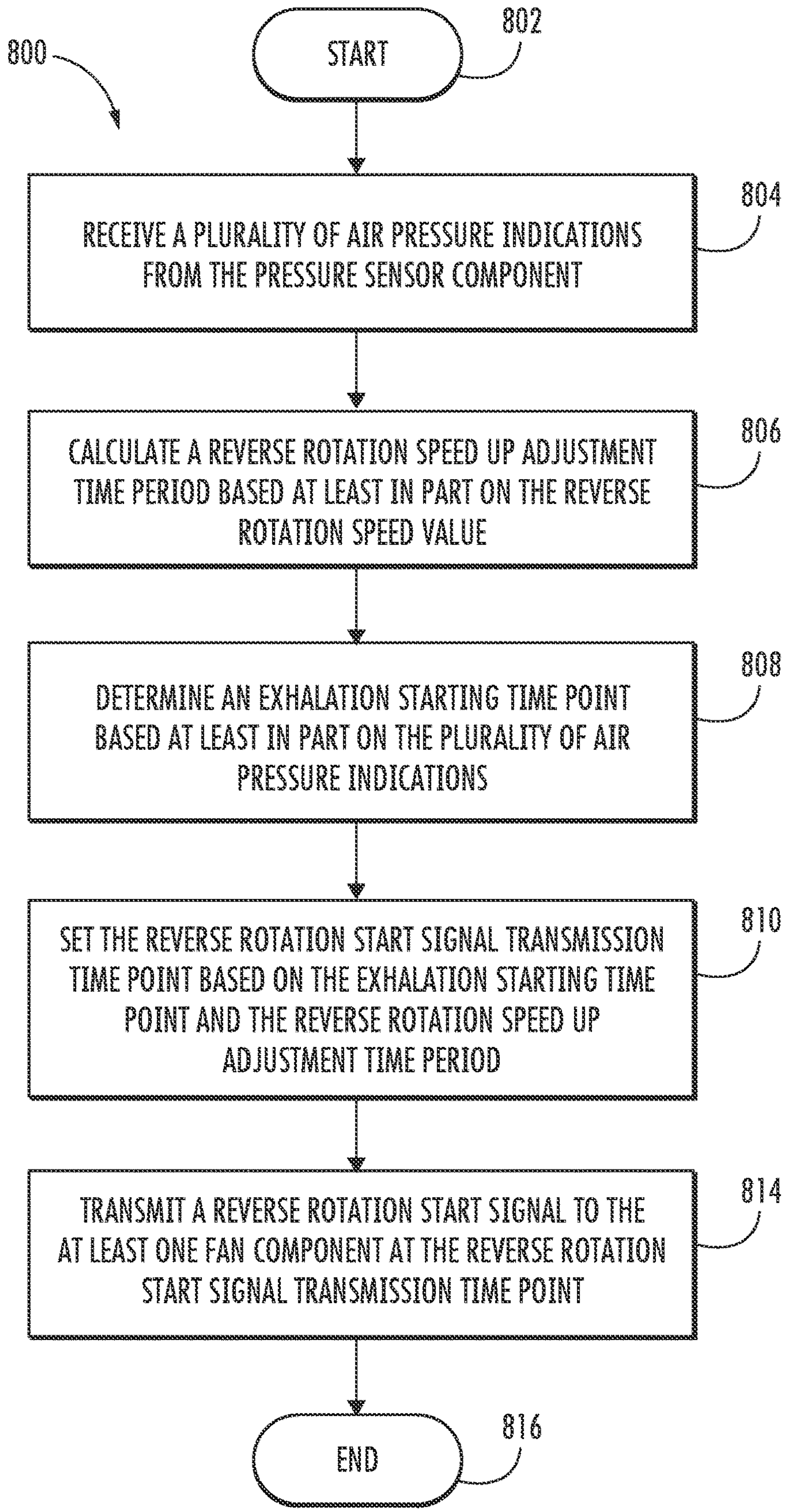
FIG. 8 illustrates an example method of determining an example reverse rotation start signal transmission time point for an example fan component in accordance with some example embodiments described herein.

Referring now to FIG. 8, an example method 800 of determining an example reverse rotation start signal transmission time point for an example fan component in accordance with some example embodiments described herein is illustrated.

In FIG. 8, the example method 800 starts at step/operation 802. In some embodiments, subsequent to and/or in response to step/operation 802, the example method 800 proceeds to step/operation 804. At step/operation 804, a controller component (such as, but not limited to, the controller component 301 of the example respiratory protective device 300 described in connection with FIG. 3 above) may receive a plurality of air pressure indications from a pressure sensor component.

In some embodiments, the plurality of air pressure indications comprises a plurality of air pressure values. For example, as described above, an example respiratory protective device in accordance with various embodiments of the present disclosure may comprise a pressure sensor component that is disposed on an inner surface of the respiratory protective device and can detect the air pressure within the respiratory protective device as a user breathes while wearing the respiratory protective device. For example, an enclosed space is created between at least a portion of the user's face (e.g. nose, nostrils, etc.), the face seal component of the respiratory protective device, and an inner surface of the inner shell component of the respiratory protective device. In some embodiments, the pressure sensor component may be positioned to detect the air pressure within this enclosed space.

In some embodiments, each of the plurality of air pressure values corresponds to time series data. In some embodiments, each time series data may indicate a time point at which one of the plurality of air pressure values is detected. For example, when a user inhales and draws air from the enclosed space, the air pressure is reduced, and the pressure sensor component may detect a reduced air pressure value, generate an air pressure indication that includes the reduced air pressure value and time series data corresponding to the time point at which the reduced air pressure value is detected, and transmit the air pressure indication to the controller component. Additionally, or alternatively, when a user exhales and releases breath into the enclosed space, the air pressure is increased, and the pressure sensor component may detect an increased air pressure value, generate an air pressure indication that includes the increased air pressure value and time series data corresponding to the time point at which the increased air pressure value is detected, and transmit the air pressure indication to the controller component.

Referring back to FIG. 8, subsequent to and/or in response to step/operation 804 (or, In some embodiments, subsequent to and/or in response to step/operation 802), the example method 800 proceeds to step/operation 806. At step/operation 806, a controller component (such as, but not limited to, the controller component 301 of the example respiratory protective device 300 described in connection with FIG. 3 above) may calculate a reverse rotation speed up adjustment time period based at least in part on the reverse rotation speed value.

In some embodiments, the reverse rotation speed value may be calculated based on various examples described herein, including, but not limited to, at least FIG. 3 to FIG. 5 described above.

In some embodiments, the reverse rotation start signal comprises an electronic instruction to the at least one fan component to start reverse rotating until reaching at a speed corresponding to the reverse rotation speed value. As described above, there may be a time delay between when the reverse rotation start signal is received by the at least one fan component and when the fan component operates at the reverse rotation speed value. For example, the fan component may receive the reverse rotation start signal when it is idle or operating in a forward rotation mode, and may require time to speed up to the reverse rotation speed value.

In the present disclosure, the term "reverse rotation speed up adjustment time period" is the time period during which the fan component speeds up from a current speed (for example, a zero speed or a forward rotation speed) to the reverse rotation speed indicated by the reverse rotation speed value. In some embodiments, the reverse rotation speed up adjustment time period may be calculated based at least in part on the reverse rotation speed value.

For example, the fan component may be a stepped fan that provides different, predetermined settings for the reverse rotation speeds, and each predetermined reverse rotation speed may correspond to a predetermined reverse rotation speed up adjustment time period. In such an example, the controller component may select a predetermined reverse rotation speed up adjustment time period that corresponds to a predetermined reverse rotation speed as indicated by the reverse rotation speed value, and may set the reverse rotation speed up adjustment time period as the predetermined reverse rotation speed up adjustment time period.

Additionally, or alternatively, the fan component may be a stepless fan that provides continuous adjustments of the reverse rotation speeds. In such an example, the controller component may determine the reverse rotation speed up adjustment time period based on dividing the reverse rotation speed value by the acceleration rate of the fan component. For example, if the reverse rotation speed value indicates a speed of 200 RPM, and the acceleration rate of the fan component is 2 RPM per millisecond (e.g. the fan component increases the rotation speed by 2 RPM per millisecond), the controller component may determine that the reverse rotation speed up adjustment time period is 100 milliseconds.

Referring back to FIG. 8, subsequent to and/or in response to step/operation 806 (or, In some embodiments, subsequent to and/or in response to step/operation 804), the example method 800 proceeds to step/operation 808. At step/operation 808, a controller component (such as, but not limited to, the controller component 301 of the example respiratory protective device 300 described in connection with FIG. 3 above) may determine an exhalation starting time point based at least in part on the plurality of air pressure indications.

As described above, the air pressure measured by the pressure sensor component decreases as a user inhales and draws air from the enclosed space, and increases as a user exhales and releases air to the enclosed space.

In some embodiments, the controller component may determine that a user has completed an inhalation and starts an exhalation (e.g. an exhalation starting time point) when the air pressure reaches a peak value (for example, when the air pressure value is more than an earlier air pressure value measured immediately prior to the air pressure value and is more than a later air pressure value that is measured immediately subsequent to the air pressure value). In some embodiments, the controller component may determine that a user has completed an exhalation and starts an inhalation (e.g. an inhalation starting time point) when the air pressure reaches a valley value (for example, when the air pressure value is less than an earlier air pressure value measured immediately prior to the air pressure value and is less than a later air pressure value that is measured immediately subsequent to the air pressure value).

In some embodiments, the controller component may determine the time period between an inhalation starting time point and an exhalation starting time point, which corresponds to how long it takes for a user to complete one breath. In some embodiments, based on the time period, the controller component may predict exhalation starting time points. For example, the controller component may determine that a user completes a breath every 3 seconds, and may determine that a user starts exhaling at time $T_0$. In such an example, the controller component may determine that the next exhalation starting time point is at $T_0+3$ seconds Referring back to FIG. 8, subsequent to and/or in response to step/operation 808, the example method 800 proceeds to step/operation 810. At step/operation 810, a controller component (such as, but not limited to, the controller component 301 of the example respiratory protective device 300 described in connection with FIG. 3 above) may set the reverse rotation start signal transmission time point based on the exhalation starting time point and the reverse rotation speed up adjustment time period.

In some embodiments, the controller component may set the reverse rotation start signal transmission time point as a point in time that is prior to the exhalation starting time point determined at step/operation 808 by the reverse rotation speed up adjustment time period calculated at step/operation 806.

For example, if the controller component determines the exhalation starting time point is at $T_0$, and that the reverse rotation speed up adjustment time period is $\Delta t$, the controller component may determine that the reverse rotation start signal transmission time point is at $T_0-\Delta t$.

Referring back to FIG. 8, subsequent to and/or in response to step/operation 810, the example method 800 proceeds to step/operation 814. At step/operation 814, a controller component (such as, but not limited to, the controller component 301 of the example respiratory protective device 300 described in connection with FIG. 3 above) may transmit a reverse rotation start signal to the at least one fan component at the reverse rotation start signal transmission time point.

In some embodiments, the reverse rotation start signal may include the reverse rotation speed value. In some embodiments, the controller component may transmit the reverse rotation start signal that includes the reverse rotation speed value to the at least one fan component at the reverse rotation start signal transmission time point determined at step/operation 810. During the reverse rotation speed up adjustment time period, the at least one fan component can speed up to the reverse rotation speed value. When the user starts exhaling at the exhalation starting time point, the at least one fan component is running at a speed corresponding to the reverse rotation speed value.

Referring back to FIG. 8, subsequent to and/or in response to step/operation 814, the example method 800 proceeds to step/operation 816 and ends.

Figure 9:
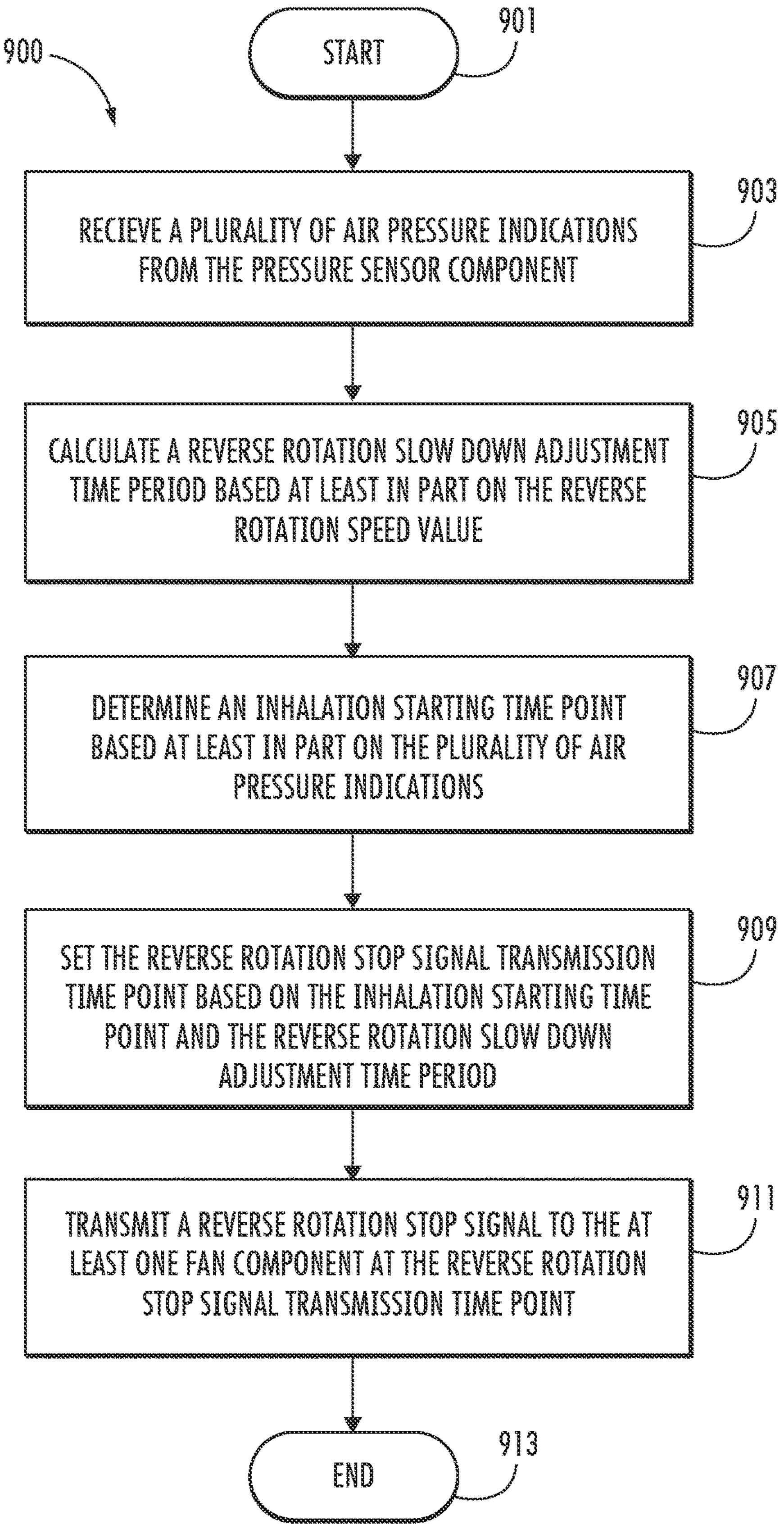
FIG. 9 illustrates an example method of determining an example reverse rotation stop signal transmission time point for an example fan component in accordance with some example embodiments described herein.

Referring now to FIG. 9, an example method 900 of determining an example reverse rotation stop signal transmission time point for an example fan component in accordance with some example embodiments described herein is illustrated.

In FIG. 9, the example method 900 starts at step/operation 901. In some embodiments, subsequent to and/or in response to step/operation 901, the example method 900 proceeds to step/operation 903. At step/operation 903, a controller component (such as, but not limited to, the controller component 301 of the example respiratory protective device 300 described in connection with FIG. 3 above) may receive a plurality of air pressure indications from the pressure sensor component, similar to those described above in connection with at least step/operation 804 of FIG. 8.

Referring back to FIG. 9, subsequent to and/or in response to step/operation 903 (or, In some embodiments, subsequent to and/or in response to step/operation 901), the example method 900 proceeds to step/operation 905. At step/operation 905, a controller component (such as, but not limited to, the controller component 301 of the example respiratory protective device 300 described in connection with FIG. 3 above) may calculate a reverse rotation slow down adjustment time period based at least in part on the reverse rotation speed value.

In some embodiments, the reverse rotation speed value may be calculated based on various examples described herein, including, but not limited to, at least FIG. 3 to FIG. 5 described above.

In some embodiments, the reverse rotation stop signal comprises an electronic instruction to the at least one fan component to stop rotating. As described above, there may be a time delay between when the reverse rotation stop signal is received by the at least one fan component and when the fan component completely stops rotating. For example, the fan component may receive the reverse rotation stop signal when it is running, and may require time to slow down.

In the present disclosure, the term "reverse rotation slow down adjustment time period" is the time period during which the fan component slows down from a current speed (for example, the reverse rotation speed or a forward rotation speed) to a zero speed. In some embodiments, the reverse rotation slow down adjustment time period may be calculated based at least in part on the reverse rotation speed value.

For example, the fan component may be a stepped fan that provides different, predetermined settings for the reverse rotation speeds, and each predetermined reverse rotation speed may correspond to a predetermined reverse rotation slow down adjustment time period. In such an example, the controller component may select a predetermined reverse rotation slow down adjustment time period that corresponds to a predetermined reverse rotation speed as indicated by the reverse rotation speed value, and may set the reverse rotation slow down adjustment time period as the predetermined reverse rotation slow down adjustment time period.

Additionally, or alternatively, the fan component may be a stepless fan that provides continuous adjustments of the reverse rotation speeds. In such an example, the controller component may determine the reverse rotation slow down adjustment time period based on dividing the reverse rotation speed value by the deceleration rate of the fan component. For example, if the reverse rotation speed value indicates a speed of 200 RPM, and the deceleration rate of the fan component is 2 RPM per millisecond (e.g. the fan component decreases the rotation speed by 2 RPM per millisecond), the controller component may determine that the reverse rotation slow down adjustment time period is 100 milliseconds.

Referring back to FIG. 9, subsequent to and/or in response to step/operation 905 (or, In some embodiments, subsequent to and/or in response to step/operation 903), the example method 900 proceeds to step/operation 907. At step/operation 907, a controller component (such as, but not limited to, the controller component 301 of the example respiratory protective device 300 described in connection with FIG. 3 above) may determine an inhalation starting time point based at least in part on the plurality of air pressure indications.

Similar to those described above in connection with step/operation 808, the air pressure measured by the pressure sensor component decreases as a user inhales and draws air from the enclosed space, and increases as a user exhales and releases air to the enclosed space. The pressure sensor component can determine the time at which a user has completed an exhalation and starts an inhalation (e.g. an inhalation starting time point), and can determine the time at which a user has completed an inhalation and starts an exhalation (e.g. an exhalation starting time point). In some embodiments, the controller component may determine the time period between an inhalation starting time point and an exhalation starting time point, and predict inhalation starting time points. For example, the controller component may determine that a user completes a breath every 3 seconds, and may determine that a user starts inhaling at time $T_0$. In such an example, the controller component may determine that the next inhalation starting time point is at $T_0+3$ seconds.

Referring back to FIG. 9, subsequent to and/or in response to step/operation 907, the example method 900 proceeds to step/operation 909. At step/operation 909, a controller component (such as, but not limited to, the controller component 301 of the example respiratory protective device 300 described in connection with FIG. 3 above) may set the reverse rotation stop signal transmission time point based on the inhalation starting time point and the reverse rotation slow down adjustment time period.

In some embodiments, the controller component may set the reverse rotation stop signal transmission time point as a point in time that is prior to the inhalation starting time point determined at step/operation 907 by at least the reverse rotation speed up adjustment time period calculated at step/operation 905.

For example, if the controller component determines that the inhalation starting time point is at $T_0$, and that the reverse rotation speed up adjustment time period is $\Delta t'$, the controller component may determine that the reverse rotation stop signal transmission time point is at $T_0-\Delta t'$ or prior to $T_0-\Delta t'$.

Referring back to FIG. 9, subsequent to and/or in response to step/operation 909, the example method 900 proceeds to step/operation 911. At step/operation 911, a controller component (such as, but not limited to, the controller component 301 of the example respiratory protective device 300 described in connection with FIG. 3 above) may transmit a reverse rotation stop signal to the at least one fan component at the reverse rotation stop signal transmission time point.

In some embodiments, the reverse rotation stop signal may include electronic instructions to cause the at least one fan component to stop rotating. For example, upon receiving the reverse rotation stop signal, the fan component may start slowing down the rotation so that when the user starts inhaling, the fan component is not rotating in the reverse direction (e.g. the fan component may be completely stopped).

Referring back to FIG. 9, subsequent to and/or in response to step/operation 911, the example method 900 proceeds to step/operation 913 and ends.

While the description above provides an example of determining reverse rotation start signal transmission time points and reverse rotation stop signal transmission time points, it is noted that the scope of the present disclosure is not limited to the description above. In some examples, an example method may determine reverse rotation start signal transmission time points and/or reverse rotation stop signal transmission time points through additional or alternative ways.

Figure 10:
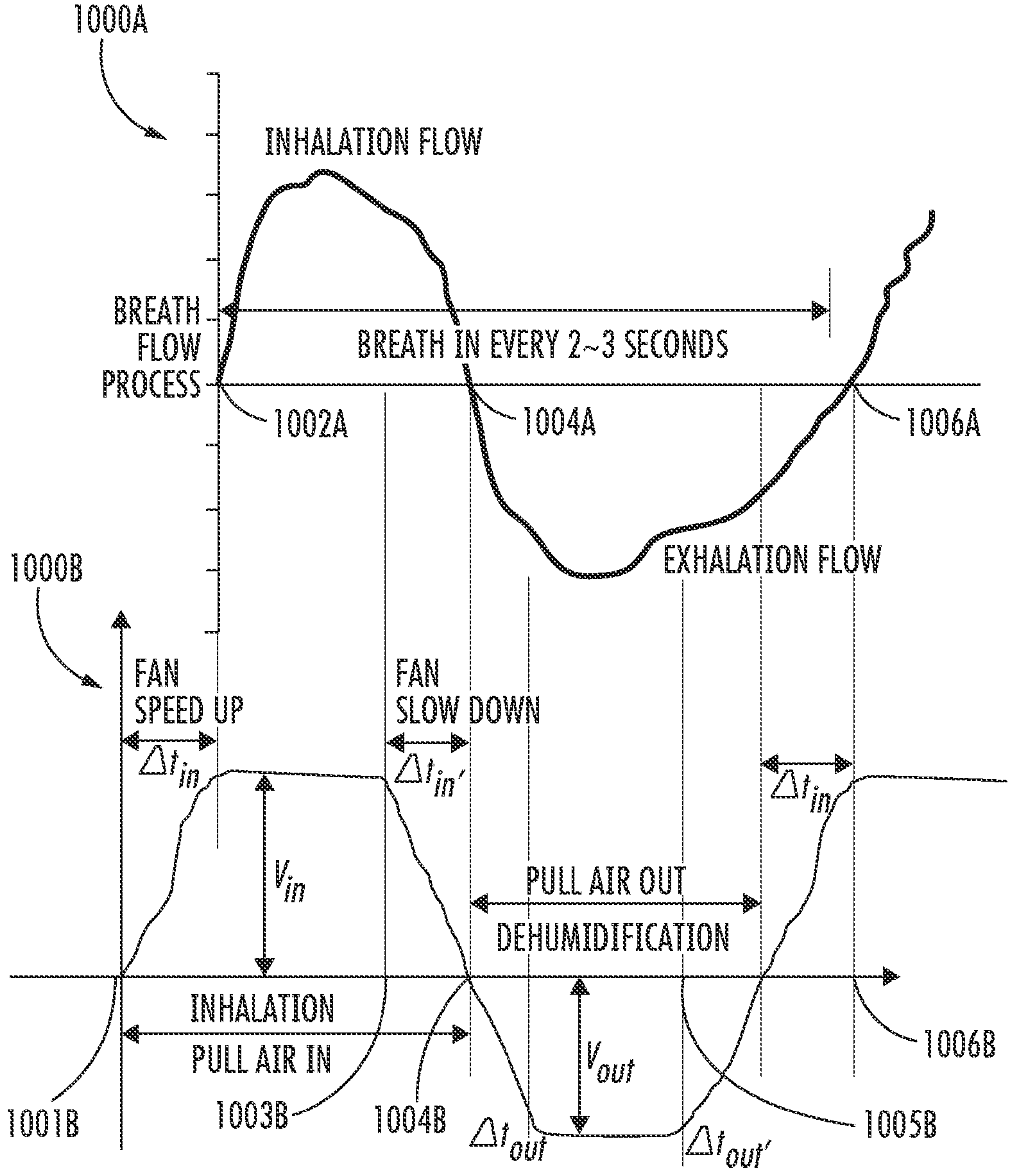
FIG. 10 illustrates an example breath flow diagram and an example fan speed diagram in accordance with some example embodiments described herein.

For example, referring now to FIG. 10, an example breath flow diagram 1000A and an example fan speed diagram 1000B in accordance with some example embodiments of the present disclosure are illustrated.

In particular, the example breath flow diagram 1000A illustrates an example breath flow process of a user. For example, the time point 1002A is an inhalation starting time point when the user starts inhaling, the time point 1004A is an exhalation starting time point when the user completes inhaling and starting exhaling, and the time point 1006A is another is an inhalation starting time point when the user completes exhaling and starting inhaling again.

In some embodiments, the time point 1002A, the time point 1004A, and the time point 1006A may be determined based at least in part on the air pressure indications from the pressure sensor component. For example, the controller component may receive air pressure indications from the pressure sensor component and determine when a user starts inhaling and when a user starts exhaling.

In some embodiments, while the user is inhaling, the controller component may cause the fan component to operate in the forward rotation mode so that air can be pulled in. For example, as shown in the example fan speed diagram 1000B of FIG. 10, the fan component may operate in the forward rotation mode between the time point 1001B and the time point 1004B.

In particular, the controller component may determine the forward rotation speed $V_{in}$ based at least in part on a breath depth value associated with the user. As described above, when the user inhales, the air pressure value decreases. When the user exhales, the air pressure value increases. In some embodiments, the breath depth value may be calculated based on an amplitude of the breath depth values (e.g. a difference between the maximum air pressure value and the minimum air pressure value). In some embodiments, the forward rotation speed $V_{in}$ is proportional to the breath depth value. For example, when a user is running, the breath depth value increases, and the forward rotation speed $V_{in}$ increases proportionally so that more air can be pulled inside the respiratory protective device. In some embodiments, the fan component may be a stepped fan component that has predetermined speed settings (e.g. high-speed, middle speed, and low speed), and the controller component may select a corresponding speed setting based at least in part on the breath depth value.

In some embodiments, the time point 1001B may correspond to a time when a start signal is sent to the fan component by the controller component to cause the fan component to start forward rotation. As shown in the fan speed diagram 1000B of FIG. 10, the time point 1001B is prior to the time point 1002A (when the user starts inhaling), and the time period $\Delta t_{in}$ between these two time points corresponds to a time period when the fan component speeds up. As such, when the user starts inhaling, the fan component may operate at a forward rotation speed $V_{in}$. In some embodiments, the time period $\Delta t_{in}$ is set to be proportional to the forward rotation speed $V_{in}$.

For example, the fan component may be a stepped fan component that has predetermined speed settings (e.g. high-speed, middle speed, and low speed), and the speed up time for the fan component to start from zero speed to each speed setting may be predetermined. When the forward rotation speed $V_{in}$ is determined to be one of these predetermined speed settings, the controller component may set the time period $\Delta t_{in}$ based on their corresponding speed up time. As such, embodiments of the present disclosure can compensate for the lag time.

Similarly, the time point 1003B may correspond to a time when a stop signal is sent to the fan component by the controller component to cause the fan component to stop forward rotation. As shown in the fan speed diagram 1000B of FIG. 10, the time point 1003B is prior to the time point 1004A (when the user starts exhaling), and the time period $\Delta t_{in}'$ between the two time points corresponds to a time period when the fan component slows down (e.g. a reverse rotation slow down adjustment time period). As such, when the user starts exhaling, the fan component has stopped running. In some embodiments, the time period $\Delta t_{in}'$ is set to be proportional to the forward rotation speed $V_{in}$.

For example, the fan component may be a stepped fan component that has predetermined speed settings (e.g. high-speed, middle speed, and low speed), and the slow down time for the fan component to start from each speed setting to zero speed setting may be predetermined. When the forward rotation speed $V_{in}$ is determined to be one of these predetermined speed settings, the controller component may set the time period $\Delta t_{in}'$ based on their corresponding slow down time. As such, embodiments of the present disclosure can compensate for the lag time.

In some embodiments, while the user is exhaling, the controller component causes the fan component to operate in the reverse rotation mode to pull air out of the respiratory protective device for the purpose of dehumidification. For example, the controller component may determine that the humidity value is more than the threshold humidity value, and may cause the fan component to operate in reverse rotation mode when the user is exhaling, similar to various examples described above.

Similar to those examples described above, the controller component may determine the reverse rotation speed $V_{out}$ based at least in part on the humidity difference value between the humidity value and the threshold humidity value (for example, the reverse rotation speed is proportional to the humidity difference value).

In the example shown in the example fan speed diagram 1000B of FIG. 10, the reverse rotation start signal transmission time point is the time point 1004B, which corresponds to the exhalation starting time point (e.g. time point 1004A). As shown, the time period $\Delta t_{out}$ is the reverse rotation speed up adjustment time period for the fan component to reach the reverse rotation speed $V_{out}$. $\Delta t_{out}'$ is the reverse rotation slow down adjustment time period that can be calculated in accordance with various example embodiments described herein.

In some embodiments, the controller component may set the reverse rotation stop signal transmission time point based on the reverse rotation slow down adjustment time period $\Delta t_{out}'$, the forward rotation speed up adjustment time period $\Delta t_{in}$, and the inhalation starting time point 1006B. For example, as shown in FIG. 10, the reverse rotation stop signal transmission time point may be set at time point 1005B that is prior to the inhalation starting time point 1006B by the reverse rotation slow down adjustment time period $\Delta t_{out}'$ and the forward rotation speed up adjustment time period $\Delta t_{in}$ For example, the controller component may determine the reverse rotation stop signal transmission time point based on subtracting the reverse rotation slow down adjustment time period $\Delta t_{out}'$ and the forward rotation speed up adjustment time period $\Delta t_{in}$ from the inhalation starting time point 1006B.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

The invention claimed is:

1. A respiratory protective device comprising:
- a humidity sensor component embedded in an exhalation filtration component of the respiratory protective device;
- at least one fan component positioned adjacent to an inhalation filtration component of the respiratory protective device; and
- a controller component in electronic communication with the humidity sensor component and the at least one fan component, wherein the controller component is configured to:
  - receive a humidity indication from the humidity sensor component, wherein the humidity indication comprises a humidity value;
  - calculate a humidity difference value between the humidity value and a threshold humidity value;
  - determine a reverse rotation speed value for the at least one fan component based on the humidity difference value; and
  - determine a reverse rotation start signal transmission time point and a reverse rotation stop signal transmission time point for the at least one fan component based at least in part on the reverse rotation speed value.

2. The respiratory protective device of claim 1, wherein, when determining the reverse rotation speed value based on the humidity difference value, the controller component is configured to:

compare the humidity difference value with a previous humidity difference value, wherein the previous humidity difference value is associated with a previous reverse rotation speed value of the at least one fan component.

3. The respiratory protective device of claim 2, wherein the controller component is configured to:

determine that the humidity difference value increases from the previous humidity difference value;

calculate a humidity difference increase value based on subtracting the previous humidity difference value from the humidity difference value;

determine a reverse rotation speed increase value based at least in part on the humidity difference increase value; and set the reverse rotation speed value based at least in part on adding the reverse rotation speed increase value to the previous reverse rotation speed value.

4. The respiratory protective device of claim 2, wherein the controller component is configured to:

determine that the humidity difference value decreases from the previous humidity difference value;

calculate a humidity difference decrease value based on subtracting the humidity difference value from the previous humidity difference value;

determine a reverse rotation speed decrease value based at least in part on the humidity difference decrease value; and set the reverse rotation speed value based at least in part on subtracting the reverse rotation speed decrease value from the previous reverse rotation speed value.

5. The respiratory protective device of claim 1, further comprising:

a pressure sensor component disposed on an inner surface of the respiratory protective device.

6. The respiratory protective device of claim 5, wherein the controller component is configured to:

receive a plurality of air pressure indications from the pressure sensor component, wherein the plurality of air pressure indications comprises a plurality of air pressure values.

7. The respiratory protective device of claim 6, wherein, when determining the reverse rotation start signal transmission time point, the controller component is configured to:

calculate a reverse rotation speed up adjustment time period based at least in part on the reverse rotation speed value;

determine an exhalation starting time point based at least in part on the plurality of air pressure indications; and set the reverse rotation start signal transmission time point based on the exhalation starting time point and the reverse rotation speed up adjustment time period.

8. The respiratory protective device of claim 7, wherein the controller component is configured to:

transmit a reverse rotation start signal to the at least one fan component at the reverse rotation start signal transmission time point.

9. The respiratory protective device of claim 6, wherein, when determining the reverse rotation stop signal transmission time point, the controller component is configured to:

calculate a reverse rotation slow down adjustment time period based at least in part on the reverse rotation speed value;

determine an inhalation starting time point based at least in part on the plurality of air pressure indications; and set the reverse rotation stop signal transmission time point based on the inhalation starting time point and the reverse rotation slow down adjustment time period.

10. The respiratory protective device of claim 9, wherein the controller component is configured to:

transmit a reverse rotation stop signal to the at least one fan component at the reverse rotation stop signal transmission time point.

* * * * *